(12) United States Patent
Akiyama et al.

(10) Patent No.: US 6,914,372 B1
(45) Date of Patent: Jul. 5, 2005

(54) ELECTRON-EMITTING ELEMENT AND ELECTRON SOURCE, FIELD EMISSION IMAGE DISPLAY DEVICE, AND FLUORESCENT LAMP UTILIZING THE SAME AND METHODS OF FABRICATING THE SAME

(75) Inventors: Koji Akiyama, Neyagawa (JP); Tetsuya Shiratori, Osaka (JP); Hideo Kurokawa, Katano (JP); Toru Kawase, Katano (JP)

(73) Assignee: Matsushita Electric Industrial Co., Ltd. (JP)

( * ) Notice: Subject to any disclaimer, the term of this patent is extended or adjusted under 35 U.S.C. 154(b) by 68 days.

(21) Appl. No.: 10/110,394

(22) PCT Filed: Oct. 12, 2000

(86) PCT No.: PCT/JP00/07092

§ 371 (c)(1),
(2), (4) Date: Apr. 12, 2002

(87) PCT Pub. No.: WO01/27963

PCT Pub. Date: Apr. 19, 2001

(30) Foreign Application Priority Data

Oct. 12, 1999 (JP) .......................................... 11/289533
Nov. 26, 1999 (JP) .......................................... 11/335923
Mar. 2, 2000 (JP) ..................................... 2000/056815

(51) Int. Cl.[7] ............................. H01J 1/30; H01J 63/06
(52) U.S. Cl. ....................... 313/309; 313/336; 313/351; 313/310; 313/311; 313/346 R; 445/49; 445/50; 445/51
(58) Field of Search ......................... 313/309–311, 336, 313/346 R, 351, 352, 495; 445/49–51, 24

(56) References Cited

U.S. PATENT DOCUMENTS 6,097,139 A * 8/2000 Tuck et al. .................. 313/310
6,184,621 B1 * 2/2001 Horiuchi et al. .............. 445/24
6,239,547 B1 * 5/2001 Uemura et al. ............. 313/309
6,417,606 B1 * 7/2002 Nakamoto et al. .......... 313/336

FOREIGN PATENT DOCUMENTS

| EP | 0 932 180 A1 | 7/1999 |
| EP | 1 020 888 A1 | 7/2000 |
| JP | 02-078128 | 3/1990 |
| JP | 04-087233 | 3/1992 |
| JP | 5-500585 | 2/1993 |
| JP | 11-003789 | 1/1999 |
| JP | 11-213866 | 8/1999 |
| JP | 11-260249 | 9/1999 |
| JP | 2000-204304 | 7/2000 |
| WO | WO 91/05361 | 4/1991 |

* cited by examiner

*Primary Examiner*—Nimeshkumar D. Patel
*Assistant Examiner*—Sharlene Leurig
(74) *Attorney, Agent, or Firm*—Parkhurst & Wendel, L.L.P.

(57) ABSTRACT

Disclosed are an electron-emitting element having a large operating current at a low operating voltage and excellent operation stability, and an electron source, an image display device and the like utilizing such an electron-emitting element, and further a method of fabricating such an element with few process steps at low cost. A cold cathode member is configured utilizing hybrid particle of a first particle serving to emit electrons into the space and a second particle being in the vicinity of the first particle and serving to control the position of the first particle. In this configuration, it is preferable that the first particle have a higher electron emission efficiency than the second particle and that the second particle be conductive.

58 Claims, 18 Drawing Sheets

5000

(a)

6000

(b)

Enlarged View of Whiskers (a)

(b)

Cathode 700 as Viewed from the Anode Side 150

(a)

(b)

Cathode 800 as Viewed from the Anode Side 150

US 6,914,372 B1

ELECTRON-EMITTING ELEMENT AND ELECTRON SOURCE, FIELD EMISSION IMAGE DISPLAY DEVICE, AND FLUORESCENT LAMP UTILIZING THE SAME AND METHODS OF FABRICATING THE SAME

TECHNICAL FIELD

The present invention relates to an electron-emitting element for emitting electrons, an electron source configured utilizing such an electron-emitting element, and an image display device and a fluorescent lamp configured utilizing such an electron source, to fabrication methods thereof, and further to a method of forming a pattern that can be suitably applied to such fabrication methods. The present invention is described below in two parts: a first invention group and a second invention group.

(Common remarks) First, the general meaning of the term "particle" as used in this specification is described. The term "particle" as used herein means a solid that exists individually and independently and does not specify shape. Examples of shapes of the "particle" include sphere, oval, column, rod, grain, cylinder, needle, tetrapod, and plate, and in a case where shape needs to be specified, a term that describes the shape, for example, such as "fiber-like particle," is provided. In addition, the term "particle" as used herein denotes one particle or two or more particles. It should be noted, however, that for a particle that is two or more particles in its normal state, the term "particle group" is sometimes used. However, this case also is not meant to exclude a particle of one. Further, for simplicity of description, single particle, agglomerated particle, and hybrid particle may simply be referred to as "particle." Meanwhile, "aggregate" particle means that made up of two or more homogeneous particles grouped together. The term "hybrid particle" means that made up of a plurality of particles having different shapes and/or made of different materials grouped together. Aspects of the present invention are divided into two parts, a first invention group and a second invention group, and are described in that order.

BACKGROUND ART OF THE FIRST INVENTION GROUP

In the past, for electron-emitting elements, the "thermal emission type", in which a high voltage is applied to a material such as tungsten that has been heated to a high temperature, had been predominant. However, in recent years, research and development for so-called "cold cathode type" electron-emitting elements has been actively pursued. Against this background, rod-like fine particles such as carbon nanotube and carbon fiber have received attention as the component material (cold cathode member) of a highly efficient electron emission source in the cold cathode type (field emission electron emitter) because of their high aspect ratio and small radius of curvature of the tip.

For example, it has been reported before that bundled carbon nanotubes are capable of providing an emission current density of as high as 400 $\mu A/cm^2$ with a turn-on voltage of as low as 64 V. It should be noted, however, that in order to use carbon nanotube as a highly efficient cold cathode member, it is required to provide electrical continuity between the electrode and the carbon nanotube by contacting the carbon nanotube with the electrode surface and to make the carbon nanotube stand substantially perpendicularly to the electrode surface. However, no techniques have been reported which allow carbon nanotube to stand substantially perpendicularly over a large area with good productivity.

De Heer et al. discloses a technique in Science, vol. 270, p. 1179 (1995) in which a suspension of carbon nanotube is passed through a ceramic filter so that the carbon nanotube is stuck in microscopic holes in the surface of the filter, and subsequently, the filter is pressed on a plastic sheet, thereby transferring the carbon nanotube on the plastic sheet. It has been reported that this technique made it possible to form a two-dimensional array of the carbon nanotube standing substantially perpendicularly to the plastic sheet and to obtain field emission of electrons from the tip of the tube.

However, in this technique, the continuity between the carbon nanotube and the electrode is hindered by the plastic sheet, and thus the operating voltage for electron emission increases. In addition, a ceramic filter with a large area is difficult to obtain, making it difficult to obtain an electron source that is patterned on a large area.

Japanese Unexamined Patent Publication No. 10-149760 discloses a technique that utilizes carbon nanotube or fullerene as an electron emitter material in a field emission cold cathode device. Specifically, a plurality of electron emitters are configured utilizing a plurality of carbon nanotubes that are arranged on the supporting substrate like fallen trees lying on top of one another. The carbon nanotubes in this case are formed, for example, in a manner such that the carbon of the anode electrode is sublimated by arc discharge and the resultant substance is then precipitated on the cathode. The precipitated carbon nanotubes are grouped together and then disposed on the electrode by a method such as coating.

However, with this technique, the carbon nanotubes tend to lie substantially parallel to the supporting substrate, which makes it difficult to arrange the carbon nanotubes so as to be substantially perpendicular to the supporting substrate. It should be noted that fullerenes are very small and thus cannot support the carbon nanotubes and make them stand. In other words, with this technique, the positions of the carbon nanotubes cannot be controlled sufficiently, and therefore it is difficult to obtain a cold cathode member having highly efficient electron-emission characteristics.

Moreover, Japanese Unexamined Patent Publication No. 10-12124 discloses a configuration of an electron-emitting element that utilizes carbon nanotube as an electron emitter. An electron emitter with this configuration is such that carbon nanotube is grown, by catalysis of a metal catalyst, in pores which are regularly arranged in an anode oxide film. This configuration and its fabrication method, however, require a great amount of time for the formation process of carbon nanotube, and therefore are not considered to provide satisfactory productivity and thus are not practical.

Furthermore, since both of the device configurations disclosed in the above-mentioned Japanese Unexamined Patent Publication Nos. 10-149760 and 10-12124 are weak in that only one end of each carbon nanotube is in contact with the electrode supporting substrate, the interaction between the supporting substrate and electrons is unstable, causing a problem of unstable operating current.

Meanwhile, in order to solve these problems, a technique is proposed in which carbon nanotube is stuck, by electrophoresis, in an organic polysilane film having been irradiated with ultraviolet (UV) rays, thereby making the carbon nanotube stand in a direction vertical to the supporting substrate (Reference: Nakayama et al., proceedings of Pan-Pacific Imaging Conference/Japan Hardcopy '98, p.p 313–316, sponsored by the Imaging Society of Japan, Tokyo, July, 1998). This technique is described with reference to FIG. 11.

First, a liquid such that carbon nanotube 1101 is dispersed in isopropyl alcohol is poured into an electrophoresis chamber 1104. Next, an electric field is applied, using an external power supply 1107, between a flat plate electrode 1105 in opposition to a supporting substrate 1103 and conductive layers 1106 patterned on the supporting substrate 1103, whereby the carbon nanotube 1101 is aligned in the direction of the electric field and at the same time is transferred, by electrophoresis, onto the conductive layers 1106. It should be noted that prior to electrophoresis, only organic polysilane films 1102 on the conductive layers 1106 are subjected to ultraviolet irradiation. By doing this, the Si—Si bonds of the organic polysilane films of the irradiated portions are broken and the films become porous, allowing the carbon nanotube 1101 to be selectively stuck in the porous portions. That is, with this technique, the carbon nanotube 1101 can be selectively arranged on the organic polysilane 1102 provided on the conductive layers 1106, by the electric field during electrophoresis, and can stand substantially perpendicularly. In addition, by patterning the organic polysilane 1102 with ultraviolet rays, a region where the carbon nanotube 1101 is to be arranged can be freely set.

DISCLOSURE OF THE FIRST INVENTION GROUP

The above-described technique for making carbon nanotube stand by electrophoresis, is, however, restricted in that organic polysilane must be used. For example, when an electron-emitting element is utilized in a display device, a process of enclosing the electron-emitting element in a vacuum vessel (fritting process) is required, and in this fritting process the device undergoes a high-temperature process at 400 to 500° C. During the process, the electron-emitting element inside the vessel is heated as well, and therefore the organic polysilane is pyrolyzed and disappears (the organic polysilane is decomposed at 300° C). That is, by undergoing the fritting process, the carbon nanotube that is fixed and held by the organic polysilane is collapsed. Consequently, the operating voltage of the electron-emitting element increases and the operating current decreases, and in the worse case, electron emission itself does not occur.

On the other hand, even if a high-temperature process is omitted so as to prevent the organic polysilane from decomposing, because of the low conductivity of the organic polysilane, the electrical connection between the conductive thin film and the carbon nanotube is hindered; as a result, it becomes difficult to realize electron emission from the carbon nanotube. In other words, the above-described technique has problems of an increase in operating voltage, great fluctuations in operating current under a certain operating voltage, and unstable element characteristics.

Furthermore, in the fabrication process, irradiation of ultraviolet rays must be performed after masking a portion where the carbon nanotube is not intended to be stuck, contributing to a cost increase.

The inventions of the first invention group are intended to solve the foregoing and other problems.

Objects of the first invention group are:

(1) to provide an electron-emitting element with which a large operating current can be obtained at a low operating voltage and which has stable electron emission characteristics;

(2) to provide a fabrication method of such an electron-emitting element with few steps and at low cost; and (3) to provide a field emission display device and a fluorescent lamp utilizing such an electron-emitting element and fabrication methods thereof.

In order to achieve these objects, the present invention is configured as follows.

According to a first aspect of the first invention group, there is provided an electron-emitting element comprising at least a first electrode and a cold cathode member disposed on a support member, wherein the cold cathode member is made up of hybrid particle of at least a first particle and a second particle, the first and second particles having different electron emission efficiencies.

According to a second aspect of the present invention, in the electron-emitting element according to the first aspect, the second particle controls a position of the first particle.

According to a third aspect of the present invention, in the electron-emitting element according to the first aspect, the first particle is rod-like or plate-like; and the second particle controls the position of the first particle so that the first particle is positioned at a certain angle to, not parallel to, the first electrode.

According to a fourth aspect of the present invention, in the electron-emitting element according to the first aspect, the first particle is mainly composed of carbon.

According to a fifth aspect of the present invention, in the electron-emitting element according to the fourth aspect, the first particle includes one selected from the group consisting of graphite particle, carbon nanotube, and carbon fiber.

According to a sixth aspect of the present invention, in the electron-emitting element according to the first aspect, the first particle is nanotube having an atom such as carbon, silicon, boron, nitrogen, and oxygen fixed thereto.

According to a seventh aspect of the present invention, in the electron-emitting element according to the first aspect, the second particle is substantially spherical.

According to an eighth aspect of the present invention, in the electron-emitting element according to the first aspect, the second particle is made of an aggregate of sphere-like particles.

According to a ninth aspect of the present invention, in the electron-emitting element according to the first aspect, the second particle is conductive.

According to a tenth aspect of the present invention, in the electron-emitting element according to the first aspect, the second particle is whisker.

According to an eleventh aspect of the present invention, in the electron-emitting element according to the tenth aspect, the second particle is mainly composed of at least one selected from the group consisting of a titanium atom, an aluminum atom, a boron atom, a carbon atom, a silicon atom, a zinc atom, and an oxygen atom.

According to a twelfth aspect of the present invention, in the electron-emitting element according to the third aspect, the height of the second particle is smaller than the size of the first particle.

According to a thirteenth aspect of the present invention, in the electron-emitting element according to the first aspect, between the cold cathode member and a second electrode, a third electrode is disposed for controlling the number of electrons emitted per unit of time from a surface of the cold cathode member.

According to a fourteenth aspect of the present invention, there is provided a field emission display device comprising the electron-emitting element in accordance with the first aspect, wherein a surface of the cold cathode member of the electron-emitting element functions as an electron emission source of the field emission display device.

According to a fifteenth aspect of the present invention, there is provided a fluorescent lamp comprising the electron-emitting element in accordance with the first aspect, wherein a surface of the cold cathode member of the electron-emitting element functions as an electron emission source of the fluorescent lamp.

According to a sixteenth aspect of the present invention, in the fluorescent lamp according to the fifteenth aspect, a second electrode is disposed so as to cover the first electrode.

According to a seventeenth aspect of the present invention, there is provided a method of fabricating an electron-emitting element comprising at least a first electrode and a cold cathode member disposed on a support member, the cold cathode member including hybrid particle made of a first particle and a second particle, the method comprising at least: forming a first electrode on a support member; dispersing a first particle over a surface of the first electrode; and forming a cold cathode member by dispersing a second particle over the surface of the first electrode.

According to an eighteenth aspect of the present invention, in the method of fabricating an electron-emitting element according to the seventeenth aspect, the first particle and the second particle have different electron emission efficiencies.

According to a nineteenth aspect of the present invention, in the method of fabricating an electron-emitting element according to the seventeenth aspect, either the first particle or the second particle is particle for emitting electrons and the other one is particle for controlling a position of the particle for emitting electrons.

According to a twentieth aspect of the present invention, in the method of fabricating an electron-emitting element according to the seventeenth aspect, the step of forming a cold cathode member is such that the second particle is dispersed after pressure is applied to the first particle that has been dispersed over the surface of the electrode.

According to a twenty-first aspect of the present invention, in the method of fabricating an electron-emitting element according to the seventeenth aspect, the step of forming a cold cathode member is such that at least the second particle is electrically charged and the second particle is dispersed over the first electrode in an atmosphere where an electric field is applied.

According to a twenty-second aspect of the present invention, there is provided a method of fabricating an electron-emitting element comprising at least a first electrode and a cold cathode member that are disposed on a support member, the cold cathode member including hybrid particle made of first particle and a second particle, the method comprising at least: forming a first electrode on a support member; and forming a cold cathode member by simultaneously dispersing a first particle and a second particle over a surface of the first electrode.

According to a twenty-third aspect of the present invention, in the method of fabricating an electron-emitting element according to the twenty-second aspect, the first particle and the second particle have different electron emission efficiencies.

According to a twenty-fourth aspect of the present invention, in the method of fabricating an electron-emitting element according to the twenty-second aspect, either the first particle or the second particle is particle for emitting electrons and the other one is particle for controlling a position of the particle for emitting electrons.

According to a twenty-fifth aspect of the present invention, in the method of fabricating an electron-emitting element according to the twenty-second aspect, the step of forming a cold cathode member is such that the first particle and the second particle are electrically charged and the first particle and the second particle are simultaneously dispersed over the first electrode in an atmosphere where an electric field is applied.

According to a twenty-sixth aspect of the present invention, in the method of fabricating an electron-emitting element according to the twenty-second aspect, the step of forming a cold cathode member is such that a dispersion in which the first particle and the second particle are dispersed in a volatile solvent is pressurized and the dispersion is discharged from a nozzle so that the dispersion is adhered to the surface of the first electrode.

According to a twenty-seventh aspect of the present invention, there is provided a method of fabricating a field emission display device comprising at least: forming an electron-emitting element according to the method of fabricating an electron-emitting element in accordance with the seventeenth aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a twenty-eighth aspect of the present invention, there is provided a method of fabricating a field emission display device comprising at least: forming an electron-emitting element according to the method of fabricating an electron-emitting element in accordance with the twentieth aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a twenty-ninth aspect of the present invention, there is provided a method of fabricating a field emission display device comprising at least: forming an electron-emitting element according to the method of fabricating an electron-emitting element in accordance with the twenty-first aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a thirtieth aspect of the present invention, there is provided a method of fabricating a field emission display device comprising at least: forming an electron-emitting element according to the method of fabricating an electron-emitting element in accordance with the twenty-second aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a thirty-first aspect of the present invention, there is provided a method of fabricating a field emission display device comprising at least: forming an electron-emitting element according to the method of fabricating an electron-emitting element in accordance with the twenty-fifth aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a thirty-second aspect of the present invention, there is provided a method of fabricating a field emission display device comprising at least: forming an electron-emitting element according to the method of fabricating an electron-emitting element in accordance with the twenty-sixth aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a thirty-third aspect of the present invention, there is provided a method of fabricating a fluorescent lamp comprising at least: forming an electron-emitting element according to the method of fabricating an electron-emitting element in accordance with the seventeenth aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a thirty-fourth aspect of the present invention, there is provided a method of fabricating a fluorescent lamp comprising at least: forming an electron-emitting element according to the method of fabricating an electron-emitting element in accordance with the twentieth aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a thirty-fifth aspect of the present invention, there is provided a method of fabricating a fluorescent lamp comprising at least: forming an electron-emitting element according to the method of fabricating an electron-emitting element in accordance with the twenty-first aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a thirty-sixth aspect of the present invention, there is provided a method of fabricating a fluorescent lamp comprising at least: forming an electron-emitting element according to the method of fabricating an electron-emitting element in accordance with the twenty-second aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a thirty-seventh aspect of the present invention, there is provided a method of fabricating a fluorescent lamp comprising at least: forming an electron-emitting element according to the method of fabricating an electron-emitting element in accordance with the twenty-fifth aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a thirty-eighth aspect of the present invention, there is provided a method of fabricating a fluorescent lamp comprising at least: forming an electron-emitting element according to the method of fabricating an electron-emitting element in accordance with the twenty-sixth aspect; forming an anode substrate having on a surface thereof a phosphor layer and a second electrode; and disposing the cold cathode member and the phosphor layer so as to oppose one another, so that the cold cathode member functions as an electron emission source for the phosphor layer.

According to a thirty-ninth aspect of the present invention, there is provided a field emission element comprising at least: a cold cathode member made of hybrid particle including a first particle for emitting electrons into the space and a second particle for controlling a position of the first particle, the second particle being in the vicinity of the first particle; and an electron-transporting member for supplying electrons to the cold cathode member; wherein the cold cathode member and the electron-transporting member are provided on a substrate.

According to a fortieth aspect of the present invention, in the field emission element according to the thirty-ninth aspect, the first particle has a higher electron emission efficiency than the second particle.

According to a forty-first aspect of the present invention, in the field emission element according to the fortieth aspect, the second particle is conductive.

According to a forty-second aspect of the present invention, in the field emission element according to the thirty-ninth aspect, the first particle is in direct contact with the second particle, is in contact with the electron-transporting member directly or via the second particle, and is in contact with a surface of the supporting substrate directly or via the second particle or via both the second particle and the electron-transporting member; and a non-contact area of the first particle that projects into the space is larger than a contact area of portions of the first particle in contact with other members.

According to a forty-third aspect of the present invention, in the field emission element according to the forty-second aspect, the second particle is conductive.

BRIEF DESCRIPTION OF THE DRAWINGS IN THE FIRST INVENTION GROUP

BRIEF DESCRIPTION OF THE DRAWINGS IN THE SECOND INVENTION GROUP

Figure 12:
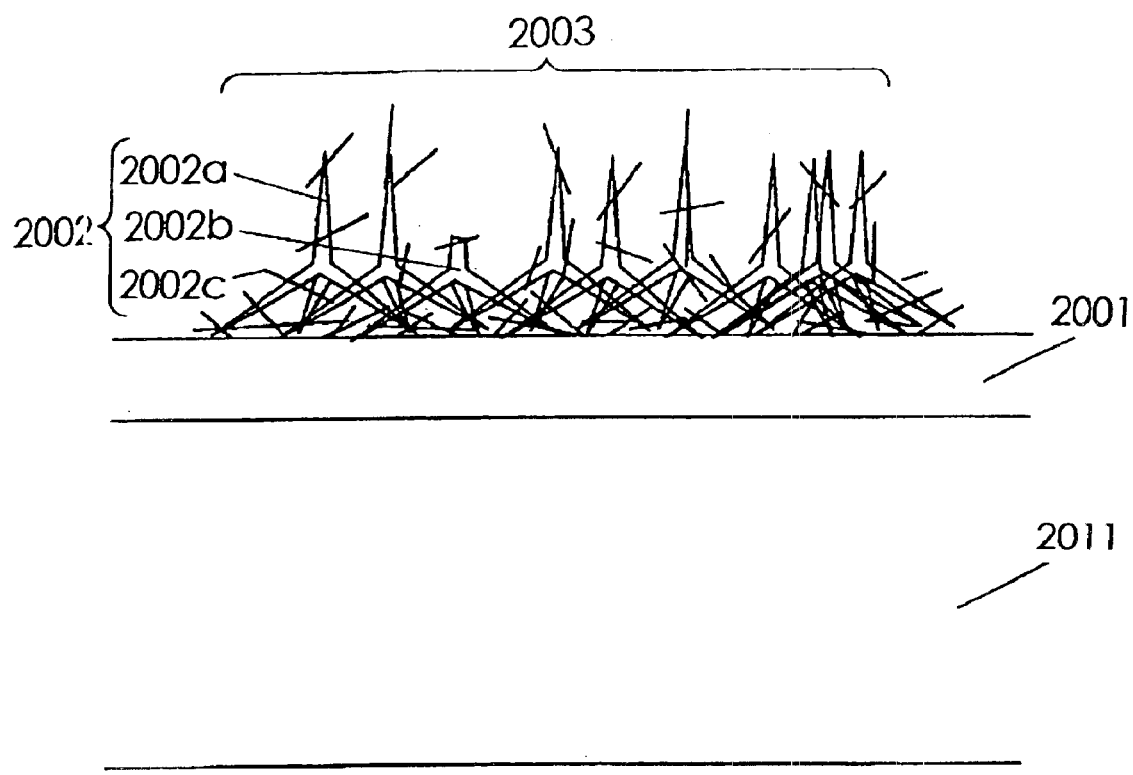

FIG. 12 is a schematic cross sectional view of an electron-emitting element of Example 2-1 of the second invention group.

Figure 13:
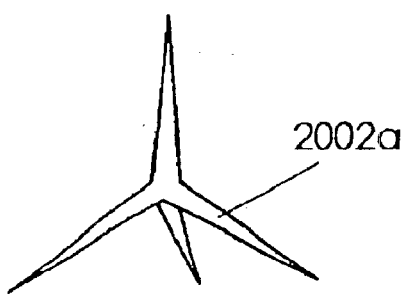

FIG. 13 is an enlarged view of a tetrapod-like whisker particle.

FIGS. 14(a) to 14(c) are schematic views illustrating the process of a fabrication method of an electron-emitting element in Example 2-1 of the second invention group.

FIGS. 15(a) to 15(f) are schematic views illustrating the process of a fabrication method of an electron-emitting element in Example 2-2 of the second invention group.

FIGS. 16(a) to 16(f) are schematic views illustrating the process of a fabrication method of an electron-emitting element in Example 2-3 of the second invention group.

FIGS. 17(a) to 17(d) are schematic views illustrating the process of a fabrication method of an electron-emitting element in Example 2-4 of the second invention group.

Figure 18:
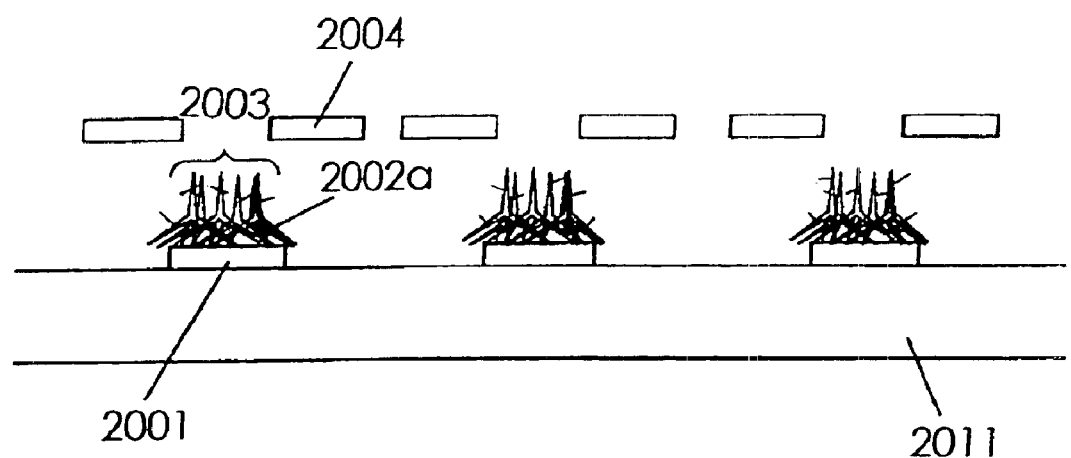

FIG. 18 is a schematic structural view of an electron source according to Example 2-9 of the second invention group.

Figure 19:
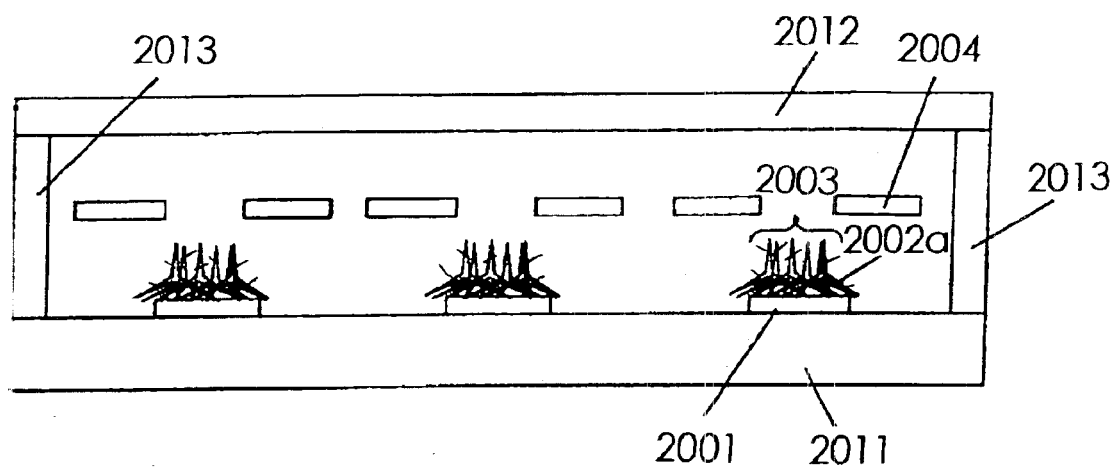

FIG. 19 is a schematic structural view of an image display device according to Example 2-10 of the second invention group.

Figure 20:
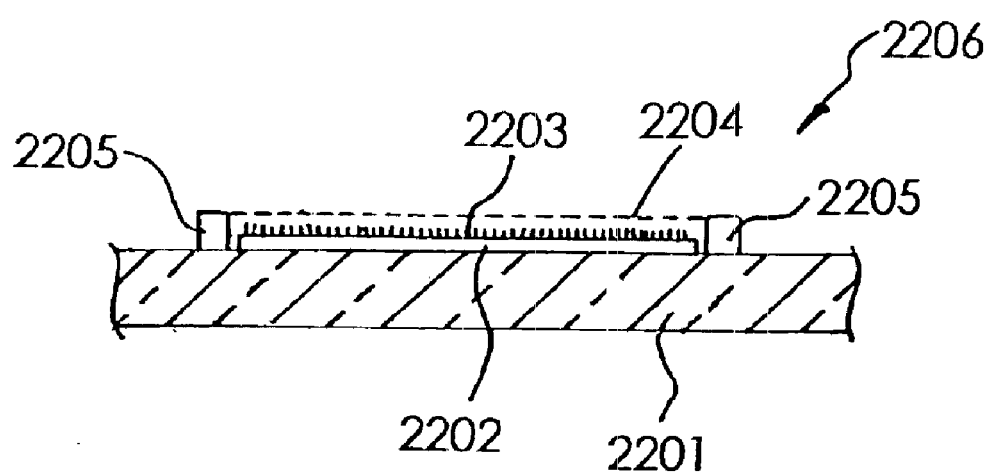

FIG. 20 is a view for illustrating a prior art electron-emitting element utilizing ZnO whisker.

BEST MODE FOR CARRYING OUT THE FIRST INVENTION GROUP

Each example of the first invention group is described in detail with reference to the drawings.

EXAMPLE 1-1

Figure 1:
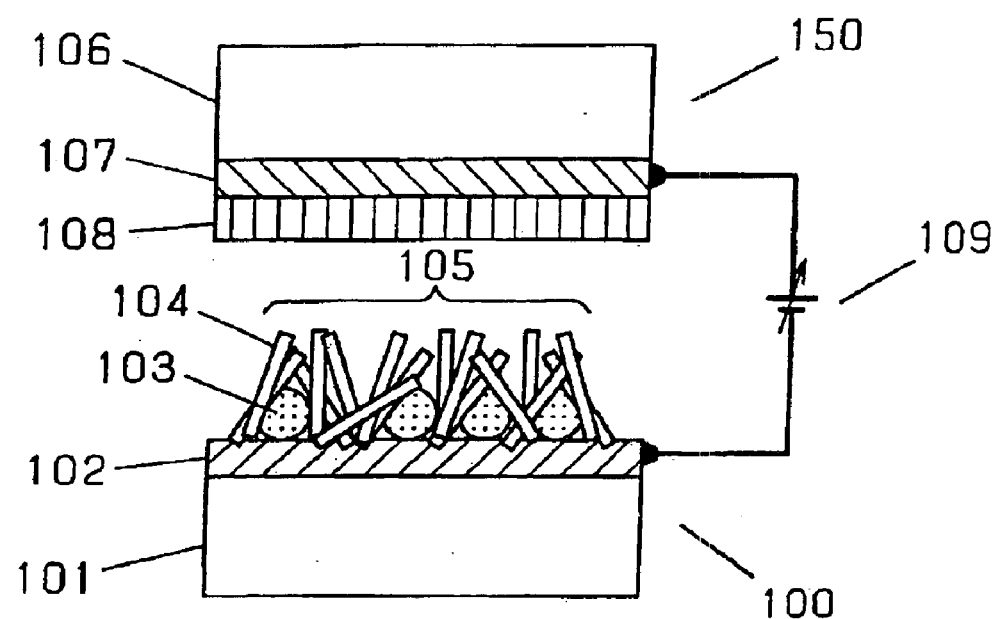
FIG. 1 is a schematic view showing the configuration of an electron-emitting element in an example of the first invention group and a field emission display device utilizing the electron-emitting element.

FIG. 1 is a schematic structural view of an electron-emitting element 100 according to Example 1-1 of the present invention and a field emission display device 1000 utilizing the electron-emitting element 100. Referring to FIG. 1, configurations and fabrication methods of the electron-emitting element 100 and the field emission display device 1000 are described below.

First, on a glass supporting substrate 101 serving as a support member a metal thin film serving as a first conductive electrode (conductive layer) 102, made of Al, an Al—Li alloy, Mg, an Mg—Ag alloy, Au, Pt, Ag, Fe, Ni, Cu, Cr, W, Mo, Co, Ta, Ti, or the like, was formed by sputtering, vacuum deposition, or plating, to a thickness of about 0.01 to 100 $\mu$m, typically to about 0.1 to 1 $\mu$m.

Next, a liquid having therein substantially spherical metal fine particle (particle size: 0.1 to 8 $\mu$m) made of a material such as Pt, Au, Ag, Cu, Ni, Rh, Pd, Co, a Cu—Sn alloy, a Cu—Zn alloy, a Cu—Ni—Zn alloy, a Cu—Pb alloy, a Cu—Pb—Sn alloy, a Cu—Co alloy, a Cu—Fe—Mn alloy, an Fe—Cr alloy, an Fe—Si alloy, an Fe—Mo alloy, an Fe—Mn alloy, an Fe—W alloy, an Fe—V alloy, an Fe—Nb alloy, stainless steel, or permalloy dispersed in a volatile organic solvent such as ethanol, isopropyl alcohol, acetone, or toluene was dripped onto the glass supporting substrate 101 and excess liquid was removed using a spin coater, whereby a second particle 103, which was metal fine particle made of metal or an metal alloy, was dispersed over the first conductive electrode 102

Subsequently, a liquid having therein carbon nanotubes (diameter: 0.5 to 100 nm, length: 2 to 10 $\mu$m) dispersed in the above-described volatile organic solvent or in water having a surface-active agent mixed therein to improve dispersibility was dripped onto the first conductive electrode 102 and was allowed to dry, thus dispersing a first fine particle 104 made of carbon nanotubes.

Thereby, a cold cathode member 105 made up of hybrid particle, in which the first particle 104 made of carbon nanotubes and the second particle 103 made of metal fine particles were mixed together, was formed over the first conductive electrode 102, and thus an electron-emitting element 100 was formed.

The electron-emitting element 100 serves as a cathode, and an anode supporting substrate 150 is disposed in opposition to the electron-emitting element 100. The anode-supporting substrate 150 has a transparent electrode made of ITO, $SnO_2$, ZnO or the like, serving as a second conductive electrode 107, and a phosphor thin film 108 stacked on a glass supporting substrate 106. Thereby, a field emission display device 1000 was configured. In this configuration, the distance between the cathode 100 and the anode 150 was set to 0.5 to 2 mm.

The space between such an electron-emitting element (cathode) 100 and an anode supporting substrate (anode) 150 was made a vacuum, and further a bias voltage was applied between the cathode 100 and the anode 150, using a direct-current power supply 109.

As a result, it was observed that under bias conditions where the voltage of the direct-current power supply 109 was about 500 V to 2 kV, electrons were emitted from the surface of the cold cathode member 105 into the vacuum and the emitted electrons were accelerated by an electric field created by the direct-current power supply 109 and collided with the phosphor thin film 108, whereby the phosphor thin film 108 emitted light. In addition, it was confirmed that the electric current flowing between the cathode 100 and the anode 150 was as large as 20 to 100 µA and the time variation was as small as 5% or less and stable.

Furthermore, even when the glass supporting substrate 101 was replaced with a metal plate and the conductive electrode 102 was eliminated, the same effect as described above was achieved.

COMPARATIVE EXAMPLE 1-1

For comparison, an electron-emitting element for comparison (1-1) was fabricated which includes a cold cathode member 105 formed by dispersing only a first particle 104 but not a second particle 103 of the above-described electron-emitting element 100, with all other components being exactly the same as those of the element 100. This element (1-1) was then examined for its electron-emission characteristics in the same manner as that described above.

As a result, in the element (1-1), electron emission was first identified when the voltage of a direct-current power supply 109 was about 3 to 15 kV, and it was found that the operating voltage was larger than that of the electron-emitting element 100. In addition, the operating current at this point was 5 to 10 µA and the time variation of the operating current under a certain operating voltage was 20 to 30%.

Figure 2:
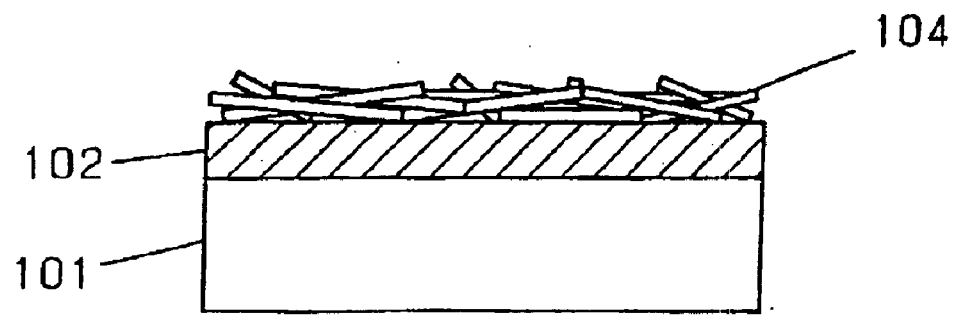
FIG. 2 is a schematic view showing an electron-emitting element for comparison in an example of the first invention group.

As described above, the electron-emission characteristics vary greatly depending on whether the second particle 103 is present or not; in order to investigate the cause of the great variation, the cold cathode member 105 of the element 100 in accordance with the present example and that of the element for comparison (1-1) were observed with a scanning electron microscope (SEM). As a result, it was confirmed that while in the cold cathode member 105 of the element for comparison (1-1), the carbon nanotubes serving as the first particle 104 overlap one another so as to be substantially parallel to the first conductive electrode 102, as shown in FIG. 2, (the carbon nanotubes are dispersed at angles in the range from 0 to 40 degrees with respect to the surface of the first conductive electrode 102 and the average angle is approximately 15 degrees), in the element 100 the carbon nanotubes stand up, as shown in FIG. 1 (the carbon nanotubes are dispersed at angles in the range from 0 to 90 degrees with respect to the surface of the first conductive electrode 102 and the average angle is approximately 60 degrees).

COMPARATIVE EXAMPLE 1-2

An electron-emitting element for comparison (1-2) was fabricated such that, opposite to the foregoing Comparative Example 1-1, only a second particle 103 but not a first particle 104 was dispersed, and then the element was examined for its electron-emission characteristics in the same manner as described above.

As a result, in the element (1-2), electron emission was first identified when the voltage of a direct-current power supply 109 was about 8 to 30 kV, and it was found that the operating voltage was rather large. In addition, the electric current flowing between the cathode and the anode was as small as 1 µA or less and the time variation was 70 to 90%.

From these results, it is thought that the reason that the operating voltage for electron emission decreases and the operating current increases when the second particle 103 made of metal fine particle and the first particle 104 are dispersed is not that the electron emission efficiency of the second particle 103 is greater than that of the first particle 104, but that the second particle 103 acts to control the position of the carbon nanotube serving as the first particle 104, that is, the second particle 103 functions to make the first particle 104 stand, and as the first particle 104 has anisotropy in electron emission efficiency, by making the first particle 104 stand up with respect to the supporting substrate, the electron emission efficiency is improved.

COMPARATIVE EXAMPLE 1-3

Moreover, an element for comparison (1-3) was fabricated in the same manner as the element (1-1), except that fine particle of insulating glass or ceramic was used for a second particle 103 in place of metal fine particle, and then the electron-emission characteristics of the element for comparison (1-3) were examined. As a result, it was found that the time variation of the electric current was 10% or more and thus the operation becomes unstable.

Consequently, it was thought that the reason that stable operation was realized in the element 100 which utilizes a conductive material for the second fine particle 103 is that an electrical connection between the first conductive electrode 102 and the first particle 104 was made via the second particle 103, lowering the contact resistance between the first conductive electrode 102 and the first particle 104.

Furthermore, as a result of further investigation, it was found that when a conductive film of metal, ITO or the like was coated over fine particle of glass or ceramic, the same electron-emission characteristics as those of the element 100 were obtained and the time variation of the operating current was 5% or less and stable.

EXAMPLE 1-2

In Example 1-2 of the present invention, in accordance with the fabrication process of the electron-emitting element 100 fabricated in Example 1-1, a second particle 103 was dispersed over a first conductive electrode 102 using a spin coater. Thereafter, a stainless steel plate was pressed down on the second fine particle 103, thereby fixing the particle to the first conductive electrode 102 by applied pressure. Subsequently, carbon nanotubes serving as a first particle 104 were dispersed in the same manner as that described in Example 1-1, thus configuring an electron-emitting element. Other components and a fabrication method are the same as those described in Example 1-1, and thus description is omitted here.

The electron-emission characteristics of the present example were examined in the same manner as in Example 1-1 and the voltage at which electrons start to be emitted was approximately 10% smaller and the emission current was approximately 10% higher than those of the element 100 in Example 1-1.

As was described above, in the electron-emitting element of the present example, the characteristics were improved, though slightly, compared to those of the electron-emitting element 100 fabricated in Example 1-1, the reason for which is thought to be that by fixing the second particle 103 by applying pressure, the second particle 103 was embedded in the first conductive electrode 102, whereby the contact resistance between the second particle 103 and the first conductive electrode 102 was lowered.

It should be noted that a material for a plate for applying pressure to the second particle 103 is not limited to stainless steel; any material can be used so long as the material is harder than the second particle 103. Further, as for the shape, even if a roller is utilized instead of a plate, substantially the same results are obtained.

EXAMPLE 1-3

In Example 1-3 of the present invention, in accordance with the fabrication process of the electron-emitting element 100 fabricated in Example 1-1, a first particle 104 and a second particle 103 were mixed together and dispersed in a volatile organic solvent such as ethanol, isopropyl alcohol, or acetone. The dispersion was then dripped onto a first conductive electrode 102 and was allowed to dry, thereby configuring a cold cathode member 105 in which the first particle 104 and the second particle 103 were mixed together, and thus configuring an electron-emitting element. Other components and a fabrication method are the same as those described in Example 1-1, and thus description is omitted here.

The electron-emission characteristics of the present example were examined in the same manner as in Example 1-1 and substantially the same results were obtained as were with the element 100 in Example 1-1. It should be noted that Example 1-1 differs from Example 1-3 in that dispersions of the first particle and of the second particle were each independently prepared.

EXAMPLE 1-4

In Example 1-4 of the present invention, an electron-emitting element was configured with nanotubes each having an atom such as carbon, silicon, boron, nitrogen, or oxygen fixed thereto (or contained therein), or nanobutes made of metal sulfide, in place of the carbon nanotube of the first particle 104 of the electron-emitting element 100 fabricated in Example 1-1. Other components are the same as those described in Example 1-1, and thus description is omitted here.

The electron-emission characteristics of the present example were examined in the same manner as in Example 1-1 and substantially the same results were obtained as were with the element 100 in Example 1-1.

EXAMPLE 1-5

Figure 3:
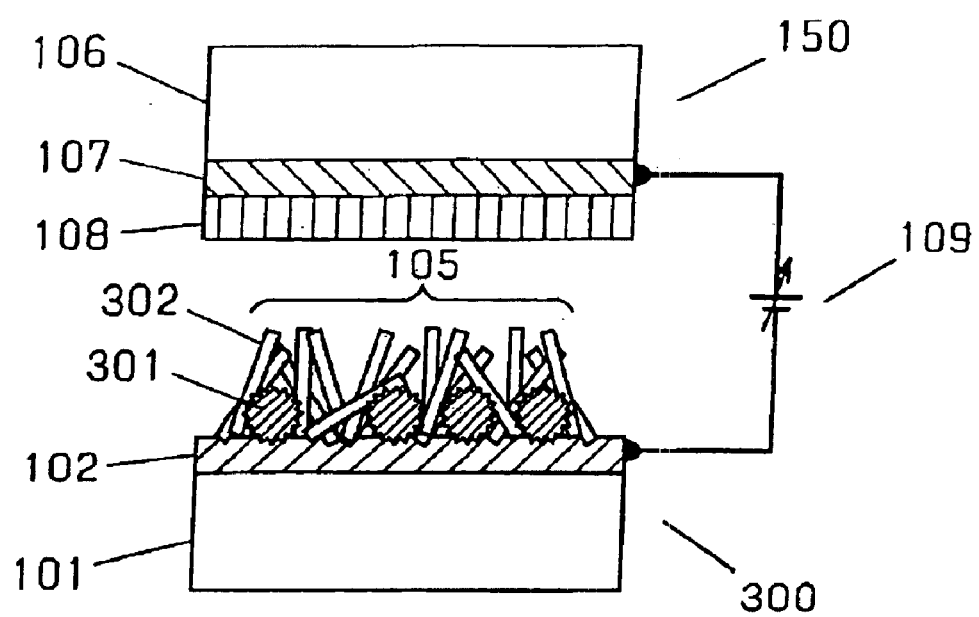
FIG. 3 is a schematic view showing the configuration of an electron-emitting element in an example of the first invention group and a light-emitting device of the field emission type utilizing the electron-emitting element.

FIG. 3 is a schematic structural view of an electron-emitting element 300 according to Example 1-5 of the present invention and a field emission display device 3000 utilizing the electron-emitting element 300.

An electron-emitting element 300 of the present example was fabricated in the following manner. By using the same process as that employed for fabricating the electron-emitting element 100 in the first example, configurations up to a first conductive electrode 102 were formed. Subsequently, as a second particle, metal fine having particles having a jagged surface like a multipointed ball particle size: 0.5 to 50 µm) made of a material such as Pt, Au, Ag, Cu, Ni, Rh, Pd, Co, a Cu—Sn alloy, a Cu—Zn alloy, a Cu—Ni—Zn alloy, a Cu—Pb alloy, a Cu—Pb—Sn alloy, a Cu—Co alloy, a Cu—Fe—Mn alloy, an Fe—Cr alloy, an Fe—Si alloy, an Fe—Mo alloy, an Fe—Mn alloy, an Fe—W alloy, an Fe—V alloy, an Fe—Nb alloy, stainless steel, or permalloy were dispersed in a volatile organic solvent such as ethanol, isopropyl alcohol, acetone, or toluene. By employing this dispersion technique, the dispersion was dripped onto a glass supporting substrate 101 and excess liquid was removed using a spin coater, thus dispersing a second particle 301 over the first conductive electrode 102.

Next, a liquid having therein carbon fiber (diameter: 0.1 to 10 µm, length: 2 to 100 µm) dispersed in the above-described volatile organic solvent or in water mixed with a surface-active agent was dripped onto the first conductive electrode 102 and was allowed to dry, thus dispersing a first fine particle 302.

Thereby, a cold cathode member 105 made up of hybrid particles, in which the first particle 302 made of carbon fiber and the second particle 301 made of metal fine particles each with a jagged surface were mixed together, was formed over the first conductive electrode 102, and thus an electron-emitting element 300 was formed.

Furthermore, as was the case with the field emission display device 1000 of Example 1-1, an anode supporting substrate 150 was disposed in opposition to the electron-emitting element 300, thus configuring a field emission display device 3000.

It should be noted that other components of the electron-emitting element 300 and the field emission display device 3000 are the same as those of the element 100 and the display device 1000 in Example 1-1, and thus description is omitted here.

The electron-emission characteristics of the element 300 of the present example were measured in the same manner as in Example 1-1 and light emission from a phosphor thin film 108 was observed under bias conditions where the voltage of a direct-current power supply 109 was about 500 V to 2 kV. In addition, it was confirmed that the electric current flowing between the cathode 100 and the anode 150 was as large as 30 to 150 µA and the time variation was as small as 5% or less and stable.

The cold cathode member 105 of the element 300 of the present example was observed with an SEM (scanning electron microscope) and it was confirmed that there were many carbon fibers 302, as shown in FIG. 3, that stand up with respect to the first conductive electrode 102.

Moreover, in the element 300, even when utilizing such sphere-like metal fine particle 103 that is shown in FIG. 1 in place of the metal fine particle 301 like a multipointed ball (it should be noted, however, that the particle size was made the same as that of the metal fine particle 301), the same results were obtained as were with the element 300.

COMPARATIVE EXAMPLE 1-4

For comparison, an electron-emitting element for comparison (1-4) was fabricated which includes a cold cathode member 105 formed by dispersing only a first particle 302 but not a second particle 301 of the electron-emitting element 300 of the present example, with all other components being exactly the same as those of the element 300. The element (1-4) was then examined for its electron-emission characteristics in the same manner as that described above.

As a result, in the element (1-4), electron emission was first identified when the voltage of a direct-current power supply 109 was about 2.5 to 10 kV, and it was found that the operating voltage was larger than that of the electron-emitting element 300. In addition, the operating current at this point was 7 to 15 µA and the time variation of the operating current under a certain operating voltage was 15 to 25%.

COMPARATIVE EXAMPLE 1-5

Moreover, an electron-emitting element for comparison (1-5) was fabricated such that, opposite to the foregoing Comparative Example 1-4, only a second particle 301 but not a first particle 302 was dispersed, and then the element was examined for its electron-emission characteristics in the same manner as that described above.

As a result, in the element (1-5), electron emission was first identified when the voltage of a direct-current power supply 109 was about 6 to 25 kV, and it was found that the operating voltage was rather large. In addition, the electric current flowing between the cathode and the anode was as small as 1 µA or less and the time variation was 70 to 90%.

From these results, it was found that the reason that the operating voltage for electron emission decreases and the operating current increases when the second particle 301 made of metal fine particle and the first particle 302 are dispersed is not that the electron emission efficiency of the second particle 301 is greater than that of the first particle 302, but that the carbon fiber serving as the first particle 302 has anisotropy in electron emission efficiency, and by the presence of the second particle 301, the carbon fiber is made to stand up, whereby the tip having a high electron emission efficiency can be easily oriented towards the anode side. It should be noted that the carbon fiber serving as the first particle is made to stand up by, as is clear from FIG. 3, the second particle that controls and supports the position of the first particle.

EXAMPLE 1-6

Figure 4:
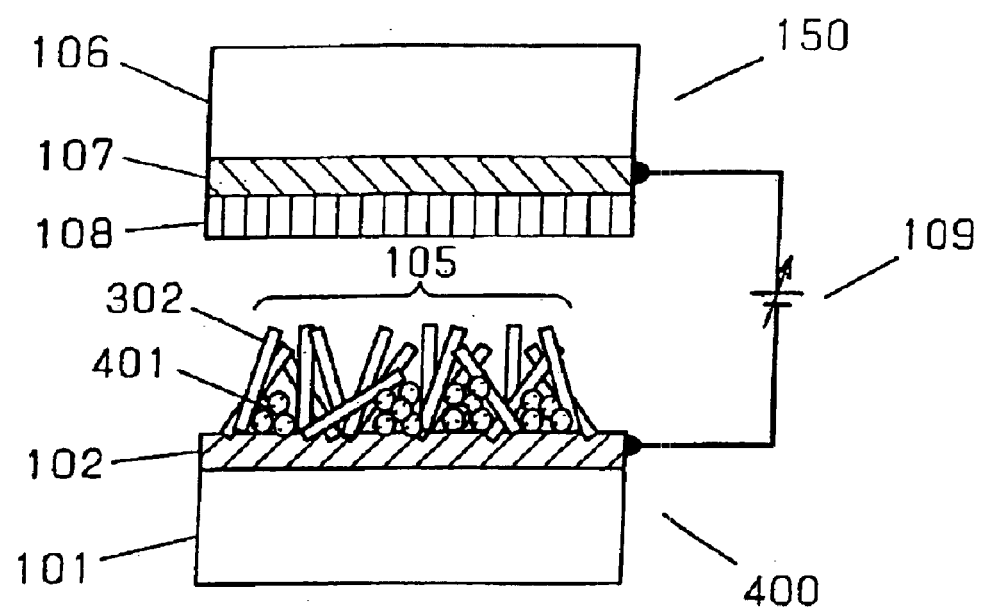
FIG. 4 is a schematic view showing the configuration of an electron-emitting element in another example of the first invention group and a light-emitting device of the field emission type utilizing the electron-emitting element.

FIG. 4 is a schematic structural view of an electron-emitting element 400 according to Example 1-6 of the present invention and a field emission display device 4000 utilizing the electron-emitting element 400.

An electron-emitting element 400 of the present example was fabricated in the following manner. By using the same process as that employed for fabricating the electron-emitting element 300 in the fifth example, configurations up to a first conductive electrode 102 were formed. Subsequently, as a second particle, a metal fine particle (particle size: 0.5 to 50 µm) which is an aggregate particle made up of fine particles with a particle size of 0.01 to 5 µm grouped together, was dispersed in a volatile organic solvent such as ethanol, isopropyl alcohol, acetone, or toluene. The metal fine particle is made of a material such as Pt, Au, Ag, Cu, Ni, Rh, Pd, Co, a Cu—Sn alloy, a Cu—Zn alloy, a Cu—Ni—Zn alloy, a Cu—Pb alloy, a Cu—Pb—Sn alloy, a Cu—Co alloy, a Cu—Fe—Mn alloy, an Fe—Cr alloy, an Fe—Si alloy, an Fe—Mo alloy, an Fe—Mn alloy, an Fe—W alloy, an Fe—V alloy, an Fe—Nb alloy, stainless steel, or permalloy. This dispersion was then dripped onto a glass supporting substrate 101 and excess liquid was removed using a spin coater, thereby dispersing a second particle 401 over the first conductive electrode 102.

Subsequently, a liquid having therein carbon fiber (diameter: 0.1 to 10 µm, length: 2 to 100 µm) dispersed in the above-described volatile organic solvent or in water mixed with an appropriate surface-active agent was dripped onto the first conductive electrode 102 and was allowed to dry, thus dispersing a first fine particle 302. Thereby, a cold cathode member 105 made up of hybrid particle of the first particle 302 made of carbon fiber and the second particle 401 made of an aggregate of metal fine particles was formed over the first conductive electrode 102, and thus an electron-emitting element 400 was formed.

Furthermore, as was the case with the field emission display device 1000 of Example 1-1, an anode supporting substrate 150 was disposed in opposition to the electron-emitting element 400, thus configuring a field emission display device 4000.

It should be noted that other components of the electron-emitting element 400 and the field emission display device 4000 are the same as those of the element 100 and the display device 1000 in Example 1-1, and thus description is omitted here.

The electron-emission characteristics of the element 400 of the present example were measured in the same manner as in Example 1-1 and light emission from a phosphor thin film 108 was observed under bias conditions where the voltage of a direct-current power supply 109 was about 500 V to 2 kV. In addition, it was confirmed that the electric current flowing between the cathode 100 and the anode 150 was as large as 30 to 150 µA and the time variation was as small as 5% or less and stable.

The cold cathode member 105 of the element 400 of the present example was observed with an SEM and it was confirmed that there were many carbon fibers 302, as shown in FIG. 4, that stand up with respect to the first conductive electrode 102.

EXAMPLE 1-7

Figure 5:
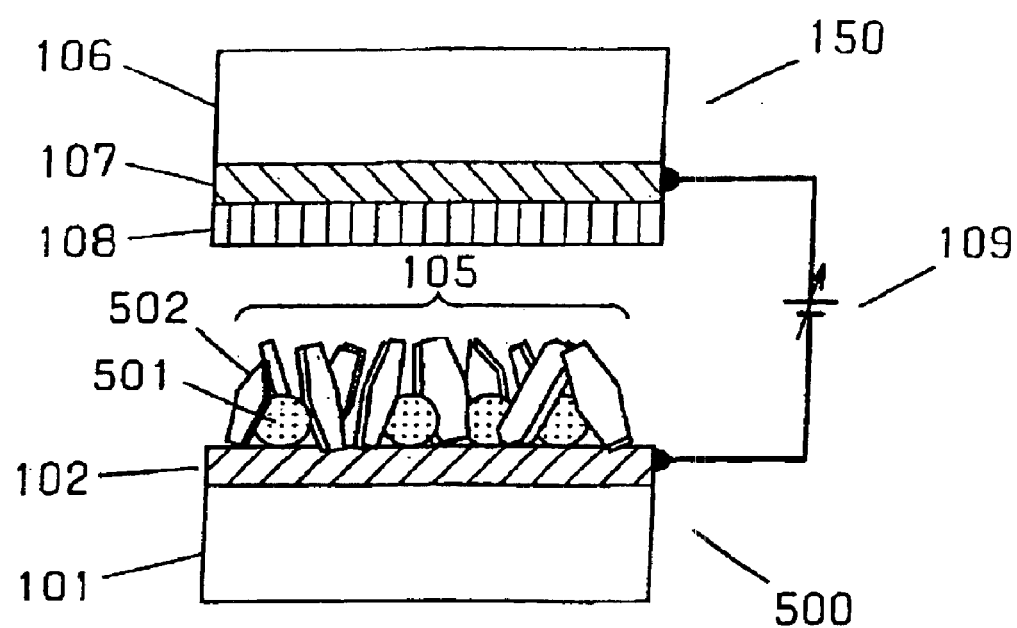
FIG. 5 is a schematic view showing the configuration of an electron-emitting element in another example of the first invention group and a light-emitting device of the field emission type utilizing the electron-emitting element.

FIG. 5 is a schematic structural view of an electron-emitting element 500 according to Example 1-7 of the present invention and a field emission display device 5000 utilizing the electron-emitting element 500.

An electron-emitting element 500 of the present example was fabricated in the following manner. By using the same process as that employed for fabricating the electron-emitting element 100 in the first example, configurations up to a first conductive electrode 102 were formed. Subsequently, as a second particle, a substantially spherical metal fine particle (particle size: 0.5 to 50 µm) made of a material such as Pt, Au, Ag, Cu, Ni, Rh, Pd, Co, a Cu—Sn alloy, a Cu—Zn alloy, a Cu—Ni—Zn alloy, a Cu—Pb alloy, a Cu—Pb—Sn alloy, a Cu—Co alloy, a Cu—Fe—Mn alloy, an Fe—Cr alloy, an Fe—Si alloy, an Fe—Mo alloy, an Fe—Mn alloy, an Fe—W alloy, an Fe—V alloy, an Fe—Nb alloy, stainless steel, or permalloy was dispersed in a volatile organic solvent such as ethanol, isopropyl alcohol, acetone, or toluene. This dispersion was then dripped onto a glass supporting substrate 101 and excess liquid was removed using a spin coater, thereby dispersing a second particle 501 over the first conductive electrode 102.

Subsequently, as a first particle, a graphite particle with a particle size of 2 to 100 µm was dispersed in the above-described volatile organic solvent or in water mixed with an appropriate surface-active agent, and the dispersion was then dripped onto the first conductive electrode 102 and was allowed to dry, thus dispersing a first fine particle 502. Thereby, a cold cathode member 105 made up of a hybrid particle, in which the first particle 502 made of graphite particle and the second particle 501 made of metal fine particle were mixed together, was formed over the first conductive electrode 102, and thus an electron-emitting element 500 was formed.

Furthermore, as was the case with the field emission display device 1000 of Example 1-1, an anode supporting substrate 150 was disposed in opposition to the electron-emitting element 500, thus configuring a field emission display device 5000.

It should be noted that other components of the electron-emitting element 500 and the field emission display device 5000 are the same as those of the element 100 and the display device 1000 in Example 1-1, and thus description is omitted here.

The electron-emission characteristics of the element 500 of the present example were measured in the same manner as in Example 1-1 and light emission from a phosphor thin film 108 was observed under bias conditions where the voltage of a direct-current power supply 109 was about 500 V to 2 kV. In addition, it was confirmed that the electric current flowing between the cathode 100 and the anode 150 was as large as 30 to 150 µA and the time variation was as small as 5% or less and stable.

The cold cathode member 105 of the element 500 of the present example was observed with an SEM and it was confirmed that there were many plate-like graphite particles 502, as shown in FIG. 5, that stand up with respect to the first conductive electrode 102.

Moreover, in the element 500, even when utilizing, in place of the sphere-like metal fine particle, such metal fine particle 301 like a multipointed ball that was shown in FIG. 3 or such metal fine particle 401 made of an aggregate of fine particles that was shown in FIG. 4, the same results were obtained as were with the element 500.

COMPARATIVE EXAMPLE 1-6

For comparison, an electron-emitting element for comparison (1-6) was fabricated which includes a cold cathode member 105 formed by dispersing only a first particle 502 but not a second particle 501 of the electron-emitting element 500 of the present example, with all other components being exactly the same as those of the element 500. The element (1-6) was then examined for its electron-emission characteristics in the same manner as that described above.

As a result, in the element (1-6), electron emission was first identified when the voltage of a direct-current power supply 109 was about 3.5 to 20 kV, and it was found that the operating voltage was larger than that of the electron-emitting element 500. In addition, the operating current at this point was 3 to 9 µA and the time variation of the operating current under a certain operating voltage was 25 to 45%.

COMPARATIVE EXAMPLE 1-7

An electron-emitting element for comparison (1-7) was fabricated such that, opposite to the foregoing Comparative Example 1-6, only a second particle 501 but not a first particle 502 was dispersed, and then the element was examined for its electron-emission characteristics in the same manner as that described above.

As a result, in the element (1-7), electron emission was first identified when the voltage of a direct-current power supply 109 was about 8 to 30 kV, and it was found that the operating voltage was rather large. In addition, the electric current flowing between the cathode and the anode was as small as 1 µA or less and the time variation was 70 to 90%.

From these results, it was found that the reason that the operating voltage for electron emission decreases and the operating current increases when the second particle 501 made of a metal fine particle and the first particle 502 are dispersed, is not that the electron emission efficiency of the second particle 501 is greater than that of the first particle 502, but that the graphite particle serving as the first particle 502 has anisotropy in electron emission efficiency, and the position of the first particle is controlled by the second particle 501, and thus the tip having a high electron emission efficiency can be oriented towards the anode side.

EXAMPLE 1-8

Figure 6:
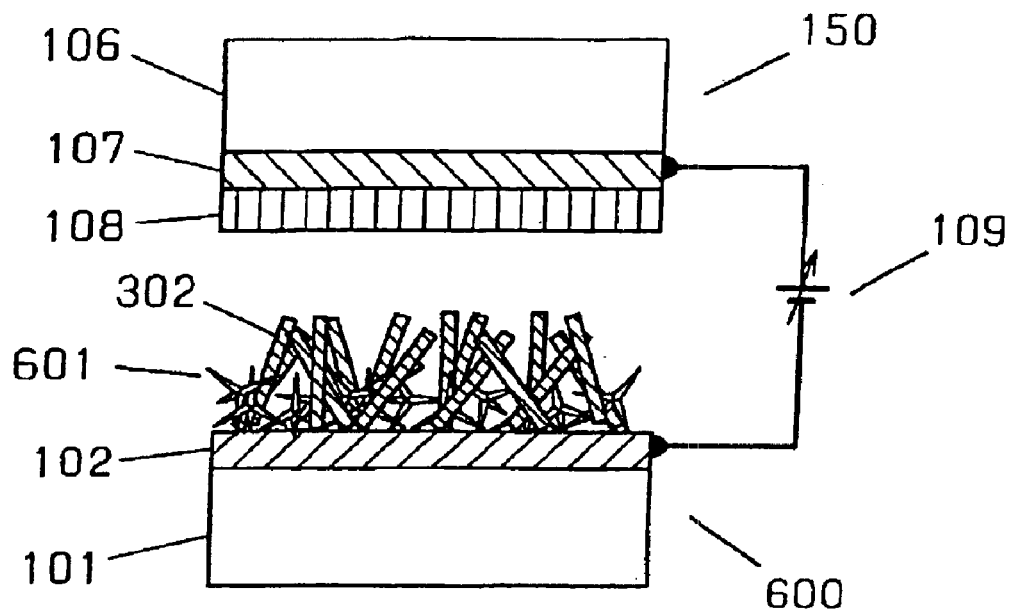
FIG. 6(a) is a schematic view showing the configuration of an electron-emitting element in another example of the first invention group and a light-emitting device of the field emission type utilizing the electron-emitting element.
FIG. 6(b) is a schematic representation of an enlarged view of whiskers shown in FIG. 6(a).
Figure 6:
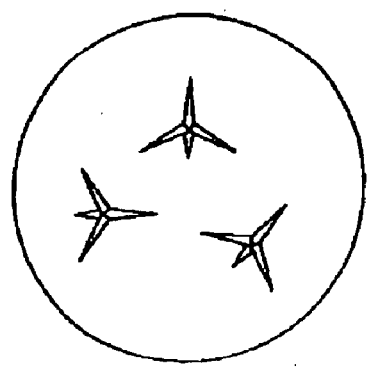

FIG. 6(*a*) is a schematic structural view of an electron-emitting element 600 according to Example 1-8 of the present invention and a field emission display device 6000 utilizing the electron-emitting element 600.

An electron-emitting element 600 of the present example was fabricated in the following manner. First, by using the same process as that employed for fabricating the electron-emitting element 100 in the first example, configurations up to a first conductive electrode 102 were formed. Subsequently, as a second particle, tetrapod-like ZnO whisker (size: 1 to 100 µm) was dispersed in a volatile organic solvent such as ethanol, isopropyl alcohol, acetone, or toluene, and then this dispersion was dripped onto a glass supporting substrate 101 and excess liquid was removed using a spin coater, thereby dispersing a second particle 601 over the first conductive electrode 102.

Subsequently, a liquid having therein carbon fiber (diameter: 0.1 to 10 µm, length: 2 to 100 µm) dispersed in the above-described volatile organic solvent or in water mixed with an appropriate surface-active agent was dripped onto the first conductive electrode 102 and was allowed to dry, thus dispersing a first particle 302. Thereby, a cold cathode member 105 in which the first particle 302 made of a carbon fiber and the second particle 601 made of a whisker were mixed together was formed over the first conductive electrode 102, and thus an electron-emitting element 600 was formed.

Furthermore, as was the case with the field emission display device 1000 of Example 1-1, an anode supporting substrate 150 was disposed in opposition to the electron-emitting element 600, thus configuring a field emission display device 6000.

It should be noted that other components of the electron-emitting element 600 and the field emission display device 6000 are the same as those of the element 100 and the display device 1000 in Example 1-1, and thus description is omitted here.

The electron-emission characteristics of the element 600 of the present example were measured in the same manner as in Example 1-1 and light emission from a phosphor thin film 108 was observed under bias conditions where the voltage of a direct-current power supply 109 was about 500 V to 2 kV. In addition, it was confirmed that the electric current flowing between the cathode 100 and the anode 150 was as large as 30 to 150 µA and the time variation was as small as 5% or less and stable.

The cold cathode member 105 of the element 600 of the present example was observed with an SEM and it was confirmed that there were many carbon fibers 302, as shown in FIG. 6(*a*), that stand up with respect to the first conductive electrode 102. It was confirmed that the whisker has a three-dimensional tetrapod shape, as shown in an enlarged view of FIG. 6(*b*), and that on the first conductive electrode 102 the whiskers overlap one another in a mesh configuration. In addition, it was observed that the carbon fiber 302 stood, embedded in the gaps in this mesh.

In the element 600, even when utilizing, in place of the ZnO whisker 601, an aluminum borate whisker, a silicon carbide whisker, or a whisker made of other materials such as TiC or TiB, or even a whisker such as above whose surface is coated with metal such as Pt, AU, Ag, Cu, Ni, Rh, Pd, Co, Mo, Cr, Al, Ti, Zn, and Sn, the same results were obtained as were with the element 600.

Moreover, in the element 600, even when utilizing, in place of the carbon fiber 302, carbon nanotube used in Example 1-1 or graphite particle used in Example 1-7, the same results were obtained as were with the element 600.

COMPARATIVE EXAMPLE 1-8

For comparison, an electron-emitting element for comparison (1-8) was fabricated which includes a cold cathode member 105 formed by dispersing only a first particle 302 but not a second particle (ZnO whisker) 601 of the electron-emitting element 600 of the present example, with all other components being exactly the same as those of the element 600. The element (1-8) was then examined for its electron-emission characteristics in the same manner as that described above.

As a result, in the element (1-8), electron emission was first identified when the voltage of a direct-current power supply 109 was about 2.5 to 10 kV and it was found that the operating voltage was larger than that of the electron-emitting element 600. In addition, the operating current at this point was 7 to 15 μA and the time variation of the operating current under a certain operating voltage was 15 to 25%.

COMPARATIVE EXAMPLE 1-9

Another electron-emitting element for comparison (1-9) was fabricated such that, opposite to the foregoing Comparative Example 1-8, only a second particle 601 but not a first particle 302 was dispersed, and then the element was examined for its electron-emission characteristics in the same manner as that described above.

As a result, in the element (1-9), electron emission was first identified when the voltage of a direct-current power supply 109 was about 3 to 12 kV, and it was found that the operating voltage was somewhat large. In addition, the electric current flowing between the cathode and the anode was as small as 5 to 10 μA and the time variation was 250 to 35%.

From these results, it was found that the reason that the operating voltage for electron emission decreases and the operating current increases when the second particle 601 made of a whisker and the first particle 302 are dispersed is not that the electron emission efficiency of the second particle 601 is greater than that of the first particle 302, but that the carbon fiber serving as the first particle 302 has anisotropy in electron emission efficiency, and by the presence of the second particle 601, the carbon fiber is made to stand up, whereby the tip having a high electron emission efficiency can be easily oriented towards the anode side.

EXAMPLE 1-9

Figure 7:
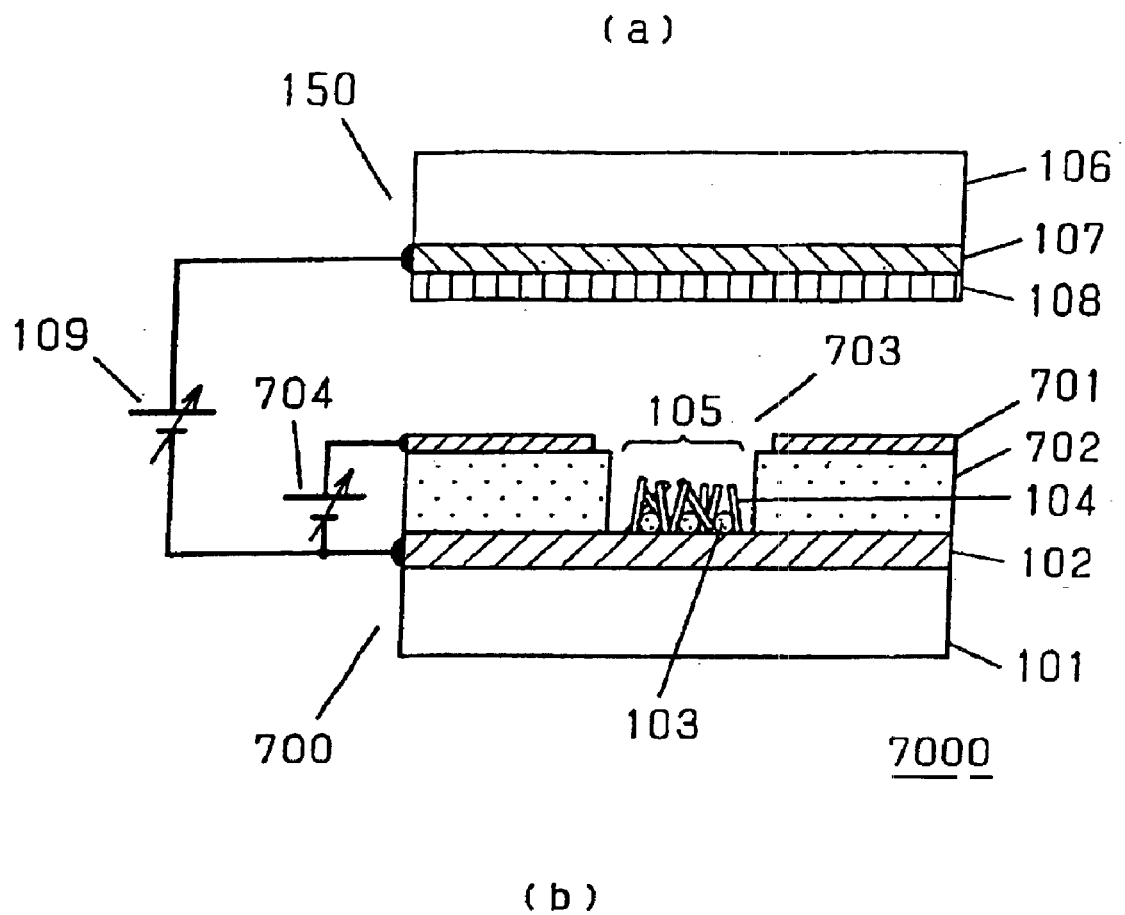
FIG. 7(a) is a schematic view showing the configuration of an electron-emitting element in another example of the first invention group and a light-emitting device of the field emission type utilizing the electron-emitting element.
FIG. 7(b) is a schematic representation of cathode 700 as viewed from anode side 150 shown in FIG. 7(a).
Figure 7:
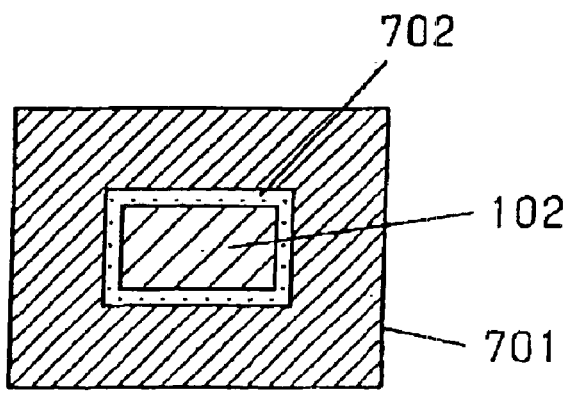

FIG. 7(*a*) is a schematic structural view of an electron-emitting element 700 according to Example 1-9 of the present invention and a field emission display device 7000 utilizing the electron-emitting element 700.

An electron-emitting element 700 of the present example was fabricated in the following manner. By using the same process as that employed for fabricating the electron-emitting element 100 in the first example, configurations up to a first conductive electrode 102 were formed, and then on the first conductive electrode 102, a dielectric layer 702 (thickness: 20 to 200 μm) of, for example, ceramic made of Al$_2$O$_3$ or the like, SiO$_2$, or Si$_3$N$_4$ was formed by sputtering or chemical vapor deposition (CVD). Subsequently, a conductive electrode (thickness: 0.1 to 50 μm) serving as a grid electrode 701 was deposited in the same manner as the first conductive electrode, and part of the electrode was then removed by photolithography or lift-off, thereby forming an opening 703. Thus, dielectric spacer 702 and grid electrode 701 were configured. FIG. 7(*b*) shows the cathode-side supporting substrate 700 at this stage when viewed from the anode side. The opening was approximately 100 μm×200 μm.

Next, a substantially spherical metal fine particle serving as a second particle, such as Pt, Au, Ag, Cu, Ni, Rh, Pd, Co, or permalloy, was dispersed in a volatile organic solvent such as ethanol, isopropyl alcohol, or acetone, and this dispersion was then dripped onto a glass supporting substrate 101 and excess liquid was removed using a spin coater, thereby dispersing a second particle 103 over the first conductive electrode 102.

Subsequently, a liquid having therein a carbon nanotube serving as a first particle dispersed in the above-described volatile organic solvent or in water mixed with an appropriate surface-active agent was dripped onto the first conductive electrode 102 through the opening 703, and was allowed to dry, thus dispersing a first fine particle 104. Thereby, a cold cathode member 105 made up of hybrid particle of the first particle 104 made of a carbon nanotube and the second particle 103 made of metal fine particle was formed on the first conductive electrode 102, and thus an electron-emitting element 700 was formed.

Next, a direct-current power supply 704 was connected between the first conductive electrode 102 and the grid electrode 701, and further, as was the case with the field emission display device 1000 of Example 1-1, an anode supporting substrate 150 was disposed in opposition to the electron-emitting element 700, thus configuring a field emission display device 7000.

It should be noted that other components of the electron-emitting element 700 and the field emission display device 7000 are the same as those of the element 100 and the display device 1000 in Example 1-1, and thus description is omitted here.

By using a direct-current power supply 109, a voltage was applied between the cathode and the anode in the same manner as in Example 1-1 and rectangular, planar light emission from a phosphor thin film 108 was identified. In addition, it was confirmed that by increasing and decreasing the voltage of the direct-current power supply 704, the brightness of the light emission from the phosphor thin film 108 varies. From this fact, it was verified that the number of electrons emitted from the cold cathode member 105 can be controlled by the grid electrode 701.

For cases of replacing the cold cathode member 105 with that of Example 1-4, that of Example 1-5, that of Example 1-6, that of Example 1-7, and that of Example 1-8 in the field emission display device 7000, examination was conducted in the same manner as described above and it was confirmed that the number of electrons emitted from the cold cathode member 105 can be controlled by the grid electrode 701.

EXAMPLE 1-10

Figure 8:
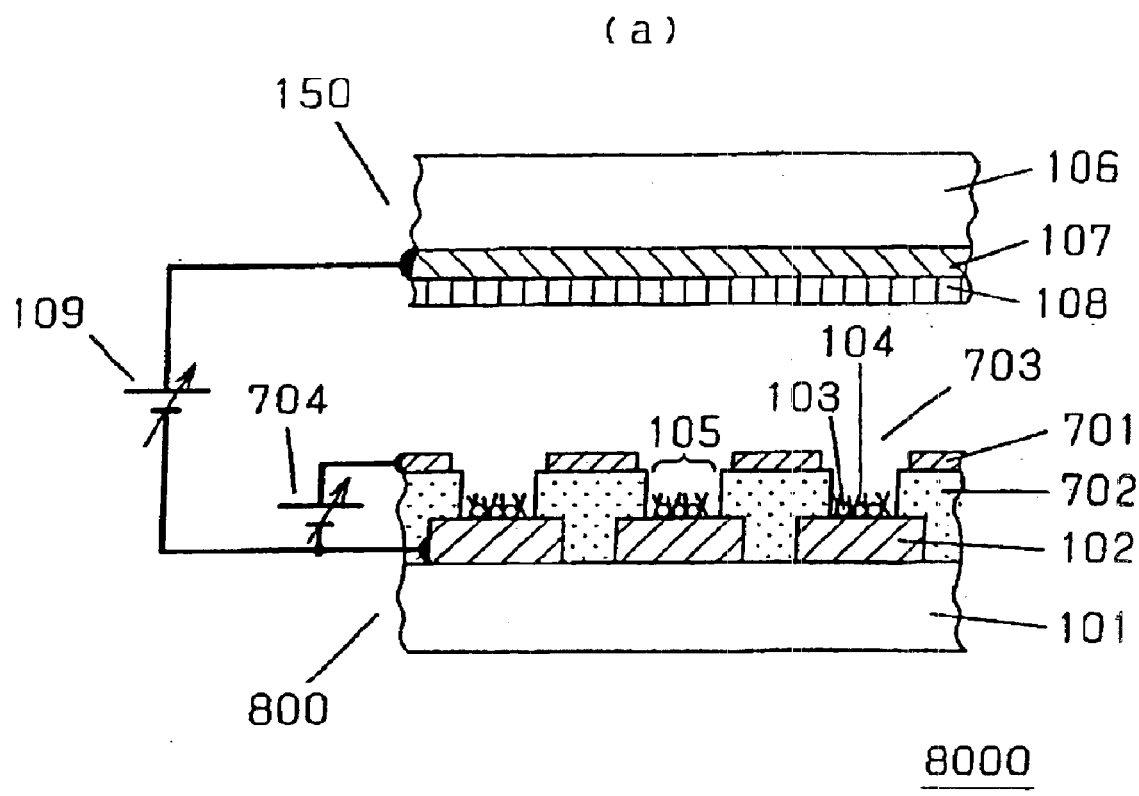
FIG. 8(a) is a schematic view showing the configuration of an electron-emitting element utilizing an array of the electron-emitting elements, shown in FIG. 7(a), and a light-emitting device of the field emission type utilizing the electron-emitting element.
FIG. 8(b) is a schematic representation of cathode 800 as viewed from anode side 150 shown in FIG. 8(a).
Figure 8:
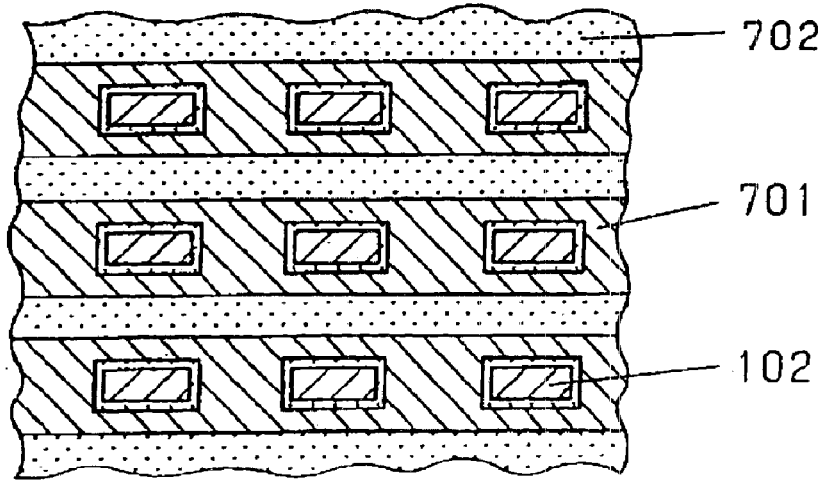

FIG. 8(*a*) is a schematic structural view of an electron-emitting element 800 according to Example 1-10 of the present invention and a field emission display device 8000 utilizing the electron-emitting element 800.

An electron-emitting element 800 of the present example was fabricated in the following manner. First, a group of first conductive electrodes 102 were formed on a glass supporting substrate 101 serving as a support member. Formation of the group of first conductive electrodes 102 was carried out by vacuum deposition or sputtering, and by using a mask with an appropriate pattern or by photolithography, a rectangular electrode pattern having 2000 electrodes electrically insulated from one another was formed.

Subsequently, dielectric spacers 702 and grid electrodes 701 that have openings 703 were configured on the group of first conductive electrodes 102 in the same manner as in Example 1-9. In the formation of the grid electrodes 701 by vacuum deposition or sputtering, a rectangular electrode pattern having 1100 electrodes electrically insulated from one another was formed by using a mask having a predetermined pattern such that the mask is in a direction orthogonal to the group of first conductive electrodes 102 or by using photolithography. In addition, the openings 703 were formed, one each at a position where the first conductive electrode 102 intersected the grid electrode 701, and accordingly 1100×2000 of the openings were arranged in a two-dimensional array. Each of the openings 703 is approximately 100 μm×200 μm. FIG. 8(b) shows part of the cathode-side supporting substrate 800 at this stage when viewed from the anode side.

Next, in a mixture of 3-methylbutyl acetate (chemical formula: $CH_2COOCH_2CH_2CH(CH_3)_2$) and 1% nitrocellulose by weight, substantially spherical metal fine particle (second particle) made of Pt, Au, Ag, Cu, Ni, Rh, Pd, Co, permalloy or the like and carbon nanotube (first particle) were dispersed, thus preparing a mixed dispersion. The mixed dispersion was then discharged into each of the openings 703, using a nozzle by the ink-jet technique (a dispersion is pressurized, whereby drops of the dispersion are sprayed from a nozzle having a narrow opening).

Subsequently, by heating the mixed dispersion to 30° C.–90° C., the 3-methylbutyl acetate, the solvent, was evaporated, and then by heating to 300° C. or more in air, the nitrocellulose was pyrolyzed and removed. Thereby, cold cathode members 105 made up of hybrid particle, in which the first particle 104 made of carbon nanotube and the second particle 103 made of metal fine particle were mixed together, were configured in all of the openings 703 on the first conductive electrodes 102, and thus an electron-emitting element array 800 was formed.

Then, a direct-current power supply 704 was connected between the first conductive electrodes 102 and the grid electrodes 701, and further as was the case with the field emission display device 1000 of Example 1-1, an anode supporting substrate 150 was disposed in opposition to the electron-emitting element 800, thus configuring a field emission display device 8000.

It should be noted that other components of the electron-emitting element 800 and the field emission display device 8000 are the same as those of the element 100 and the display device 1000 in Example 1-1, and thus description is omitted here.

A voltage was applied between the cathode and the anode using a direct-current power supply 109 in the same manner as in Example 1-1. As a result, planar light emission from a phosphor thin film 108 was identified. In addition, it was confirmed that by increasing and decreasing the voltage of the direct-current power supply 704, the brightness of the light emission from the phosphor thin film 108 varies. From this fact, it was verified that the number of electrons emitted from the cold cathode members 105 can be controlled by the grid electrodes 701.

Next, a voltage was sequentially applied to each of the first conductive electrodes 102 and to each of the grid electrodes 701 such that a given voltage was applied across all of the cathode members 105 in 33 ms; as a result, light emission from the phosphor layer 108 effected the display of monochrome images.

Color images can be displayed by using such a phosphor thin film 108 that has phosphors which emit light in red, green, and blue, corresponding to each cold cathode member 105.

Moreover, in order to further increase the brightness of light emission from phosphors, it is possible to deposit on the phosphor thin film 108 a reflective layer (for example, an Al layer with a thickness of 0.05 to 1 μm) to collect light emission from the phosphor thin film 108 on the side of the glass supporting substrate 106.

For cases of replacing the cold cathode member 105 with that of Example 1-4, that of Example 1-5, that of Example 1-6, that of Example 1-7, and that of Example 1-8 in the field emission display device 8000, examination was conducted in the same manner as described above and it was confirmed that images can be displayed.

For preparation of the above-described dispersion, in which the first particle 104 and the second particle 103 are mixed together, the mixing ratio of the first particle 104 and the second particle 103 is preferably in the range of 1:1 to 100:1 in weight ratio, more preferably in the range of 1:3 to 1:20.

EXAMPLE 1-11

In Example 1-11 of the present invention, in accordance with the fabrication process of the electron-emitting element 100 fabricated in Example 1-1, a first conductive electrode 102 was formed. Thereafter, in a mixture of 3-methylbutyl acetate and 1% nitrocellulose by weight, as a second particle 103, substantially spherical metal fine particle made of Pt, Au, Ag, Cu, Ni, Rh, Pd, Co, permalloy, or the like was dispersed, thus preparing a dispersion. The dispersion was then coated on the first conductive electrode 102. Subsequently, by heating the dispersion to 30° C.–90° C., the 3-methylbutyl acetate, the solvent, was evaporated, whereby the first conductive electrode 102 and the second particle 103 were coated with nitrocellulose.

Subsequently, by passing a supporting substrate 101 under a corotron or scorotron that produces corona discharge, the first conductive electrode 102 and the surface of the second particle 103 that were coated with nitrocellulose were electrically charged and then brought into contact with fine particle of carbon nanotube that was electrically charged by friction. Thereby, the carbon nanotube was attracted to the first conductive electrode 102 and to the surface of the second particle 103 by electrostatic force and attached as a first particle 104.

Next, by heating to 300° C or more in air, the nitrocellulose was pyrolyzed and removed, thereby configuring over the first conductive electrode 102 a cold cathode member 105 made up of hybrid particle, in which the first particle 104 made of carbon nanotube and the second particle 103 made of metal fine particle were mixed together, and thus an electron-emitting element 100 was formed.

It should be noted that other components and a fabrication method are the same as those described in Example 1-1, and thus description is omitted here.

The electron-emission characteristics of the present example were examined in the same manner as in Example 1-1 and the same results were obtained as were with the element 100 in Example 1-1. In addition, even when utilizing whisker used in Example 1-8 for the second particle 103 in place of sphere-like metal fine particle, the same results were obtained.

EXAMPLE 1-12

In Example 1-12 of the present invention, in accordance with the fabrication process of the electron-emitting element 100 fabricated in Example 1-1, a first conductive electrode 102 was formed. Thereafter, a mixture of 3-methylbutyl acetate and 1% nitrocellulose by weight was coated on the first conductive electrode 102. Subsequently, by heating the mixture to 30° C.–90° C., the 3-methylbutyl acetate, the solvent, was evaporated such that the first conductive electrode 102 was coated with nitrocellulose. Then, this supporting substrate 101 was passed under a corotron or scorotron that produces corona discharge, thereby electrically charging the surface of the first conductive electrode 102 coated with nitrocellulose. Meanwhile, hybrid powder of substantially spherical glass or ceramic particle serving as a second particle 103 and carbon nanotube serving as a first particle 104 were electrically charged by friction. The hybrid powder was then contacted with the surface of the first conductive electrode 102. At this point, the glass or ceramic particle and the carbon nanotube were attracted to the surface of the first conductive electrode 102 by electrostatic force and attached, respectively, as the second particle 103 and the first particle 104. Next, by heating to 300° C. or more in air, the nitrocellulose was pyrolyzed and removed, thereby configuring over the first conductive electrode 102 a cold cathode member 105, in which the first particle 104 made of carbon nanotube and the second particle 103 made of glass or ceramic particle were mixed together, and thus an electron-emitting element 100 was formed.

It should be noted that other components and a fabrication method are the same as those described in Example 1-1, and thus description is omitted here.

The electron-emission characteristics of the present example were examined in the same manner as in Example 1-1 and substantially the same results were obtained as were with the element for comparison (1-3) in Example 1-1. It should be noted, however, that it was confirmed that even when utilizing sphere-like glass or ceramic particle, the second particle can be electrically charged and disposed on the substrate by electrostatic force.

EXAMPLE 1-13

Figure 9:
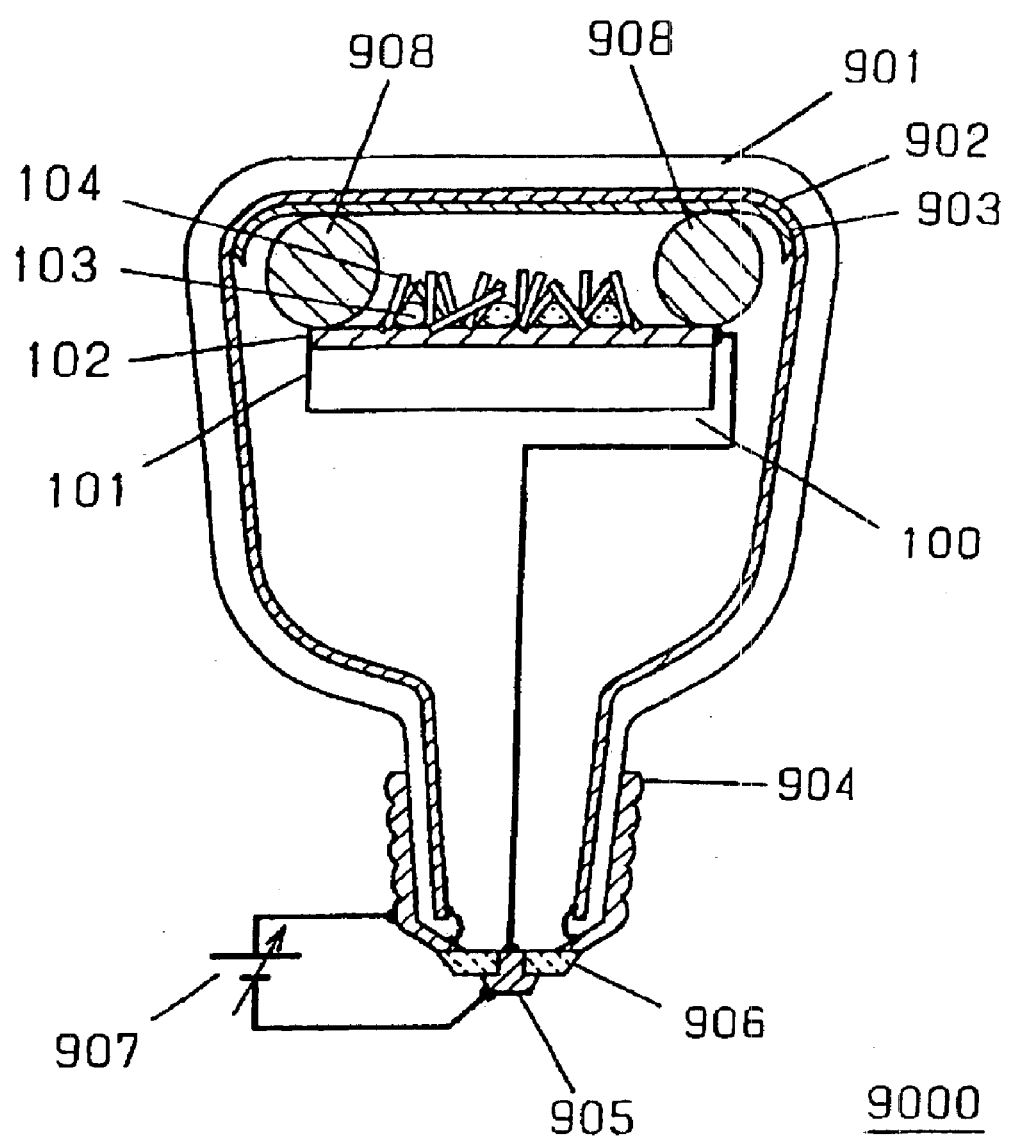
FIG. 9 is a schematic view showing the configuration of an electron-emitting element in another example of the first invention group and a fluorescent lamp utilizing the electron-emitting element.

In Example 1-13 of the present invention, the electron-emitting element 100 fabricated in Example 1-1 was configured in such a fluorescent lamp 9000 that is shown in FIG. 9.

An electron-emitting element 100 having a first conductive electrode 102, a second particle 103, and a first particle 104 formed in that order on a glass supporting substrate 101 was disposed in a flask-like glass container 901 having a flat bottom surface. On the inner wall of the glass container 901 an ITO transparent conductive film 902 serving as a second conductive electrode is coated on almost the entire surface, and on the base portion a phosphor thin film 903 is further deposited.

The inside of the glass container 901 is a vacuum, and at the opening portion of the glass container 901 a cap 904 is provided so that the glass container can be screwed into a socket. In addition, at the opening portion of the glass container 901 an extraction electrode 905 that is electrically connected to the first conductive electrode 102 is provided, and the extraction electrode 905 is electrically insulated from the cap 904 by an insulator 906. Here, the distance between the cathode 100 and the phosphor thin film 903 is set to 0.5 to 2 mm. Further, in order to maintain this distance, dielectric spacers 908 made of glass fiber, bead, or the like were used whose diameter was the same as this distance. When the glass container 901 was vacuum-sealed, the temperature of the fluorescent lamp 9000 reached 400 to 500° C.

A bias voltage was applied between the cap 904 and the extraction electrode 905, using a direct-current power supply 907 and light emission from the phosphor thin film 903 was observed under bias conditions where the voltage of the direct-current power supply 907 was about 500 V to 2 kV.

It should be noted that even when the glass supporting substrate 101 was replaced with a metal plate and the conductive electrode 102 was eliminated, a similar effect to the above was obtained.

EXAMPLE 1-14

In Example 1-14 of the present invention, using an electron-emitting element 100 fabricated in Example 1-2, a fluorescent lamp 9000 was configured in the same manner as that described in Example 1-13. Other components and a fabrication method are the same as those described in Example 1-13, and thus description is omitted here.

The characteristics of the fluorescent lamp of the present example were examined in the same manner as in Example 1-13 and light emission from a phosphor thin film 903 was observed under bias conditions where the voltage of a direct-current power supply 907 was about 450 V to 1.7 kV.

EXAMPLE 1-15

In Example 1-15 of the present invention, using an electron-emitting element 100 fabricated in Example 1-3, a fluorescent lamp 9000 was configured in the same manner as that described in Example 1-13. Other components and a fabrication method are the same as those described in Example 1-13, and thus description is omitted here.

The characteristics of the fluorescent lamp of the present example were examined in the same manner as in Example 1-13 and light emission from a phosphor thin film 903 was observed under bias conditions where the voltage of a direct-current power supply 907 was about 500 V to 2 kV.

EXAMPLE 1-16

In Example 1-16 of the present invention, using an electron-emitting element 100 fabricated in Example 1-11, a fluorescent lamp 9000 was configured in the same manner as that described in Example 1-13. Other components and a fabrication method are the same as those described in Example 1-13, and thus description is omitted here.

The characteristics of the fluorescent lamp of the present example were examined in the same manner as in Example 1-13 and light emission from a phosphor thin film 903 was observed under bias conditions where the voltage of a direct-current power supply 907 was about 500 V to 2 kV.

EXAMPLE 1-17

In Example 1-17 of the present invention, using an electron-emitting element 100 fabricated in Example 1-12, a fluorescent lamp 9000 was configured in the same manner as that described in Example 1-13. Other components and a fabrication method are the same as those described in Example 1-13, and thus description is omitted here.

The characteristics of the fluorescent lamp of the present example were examined in the same manner as in Example 1-13 and light emission from a phosphor thin film 903 was observed under bias conditions where the voltage of a direct-current power supply 907 was about 500 V to 2 kV.

EXAMPLE 1-18

In Example 1-18 of the present invention, using an electron-emitting element 100 fabricated in Example 1-4, a fluorescent lamp 9000 was configured in the same manner as that described in Example 1-13. Other components and a fabrication method are the same as those described in Example 1-13, and thus description is omitted here.

The characteristics of the fluorescent lamp of the present example were examined in the same manner as in Example 1-13 and light emission from a phosphor thin film 903 was observed under bias conditions where the voltage of a direct-current power supply 907 was about 500 V to 2 kV.

EXAMPLE 1-19

In Example 1-19 of the present invention, using an electron-emitting element 300 fabricated in Example 1-5, a fluorescent lamp 9000 was configured in the same manner as that described in Example 1-13. Other components and a fabrication method are the same as those described in Example 1-13, and thus description is omitted here.

The characteristics of the fluorescent lamp of the present example were examined in the same manner as in Example 1-13 and light emission from a phosphor thin film 903 was observed under bias conditions where the voltage of a direct-current power supply 907 was about 500 V to 2 kV.

EXAMPLE 1-20

In Example 1-20 of the present invention, using an electron-emitting element 400 fabricated in Example 1-6, a fluorescent lamp 9000 was configured in the same manner as that described in Example 1-13. Other components and a fabrication method are the same as those described in Example 1-13, and thus description is omitted here.

The characteristics of the fluorescent lamp of the present example were examined in the same manner as in Example 1-13 and light emission from a phosphor thin film 903 was observed under bias conditions where the voltage of a direct-current power supply 907 was about 500 V to 2 kV.

EXAMPLE 1-21

In Example 1-21 of the present invention, using an electron-emitting element 500 fabricated in Example 1-7, a fluorescent lamp 9000 was configured in the same manner as that described in Example 1-13. Other components and a fabrication method are the same as those described in Example 1-13, and thus description is omitted here.

The characteristics of the fluorescent lamp of the present example were examined in the same manner as in Example 1-13 and light emission from a phosphor thin film 903 was observed under bias conditions where the voltage of a direct-current power supply 907 was about 500 V to 2 kV.

EXAMPLE 1-22

In Example 1-22 of the present invention, using an electron-emitting element 600 fabricated in Example 1-8, a fluorescent lamp 9000 was configured in the same manner as that described in Example 1-13. Other components and a fabrication method are the same as those described in Example 1-13, and thus description is omitted here.

The characteristics of the fluorescent lamp of the present example were examined in the same manner as in Example 1-13 and light emission from a phosphor thin film 903 was observed under bias conditions where the voltage of a direct-current power supply 907 was about 500 V to 2 kV.

EXAMPLE 1-23

In Example 1-23 of the present invention, in accordance with the fabrication process of an electron-emitting element 100 fabricated in Example 1-3, a first particle 104 and a second particle 103 were mixed in 3-methylbutyl acetate containing 1% nitrocellulose by weight, thus preparing a suspension. This suspension was coated onto a first conductive electrode 102, using an ink-jet nozzle, in the same manner as in Example 1-10 and was then allowed to dry. Subsequently, by heating the suspension to 300° C. or more in air, the nitrocellulose was pyrolyzed and removed, thus configuring over the first conductive electrode 102 a cold cathode member 105, in which the first particle 104 made of carbon nanotube and the second particle 103 made of metal fine particle are mixed together, and thus an electron-emitting element 100 was formed. Other components and a fabrication method are the same as those described in Example 1-3, and thus description is omitted here.

Using the electron-emitting element 100 fabricated in the present example, a fluorescent lamp 9000 was configured in the same manner as hat described in Example 1-13. Other components and a fabrication method are the same as those described in Example 1-13, and thus description is omitted here.

The characteristics of the fluorescent lamp of the present example were examined in the same manner as in Example 1-13 and light emission from a phosphor thin film 903 was observed under bias conditions where the voltage of a direct-current power supply 907 was about 500 V to 2 kV

EXAMPLE 1-24

Figure 10:
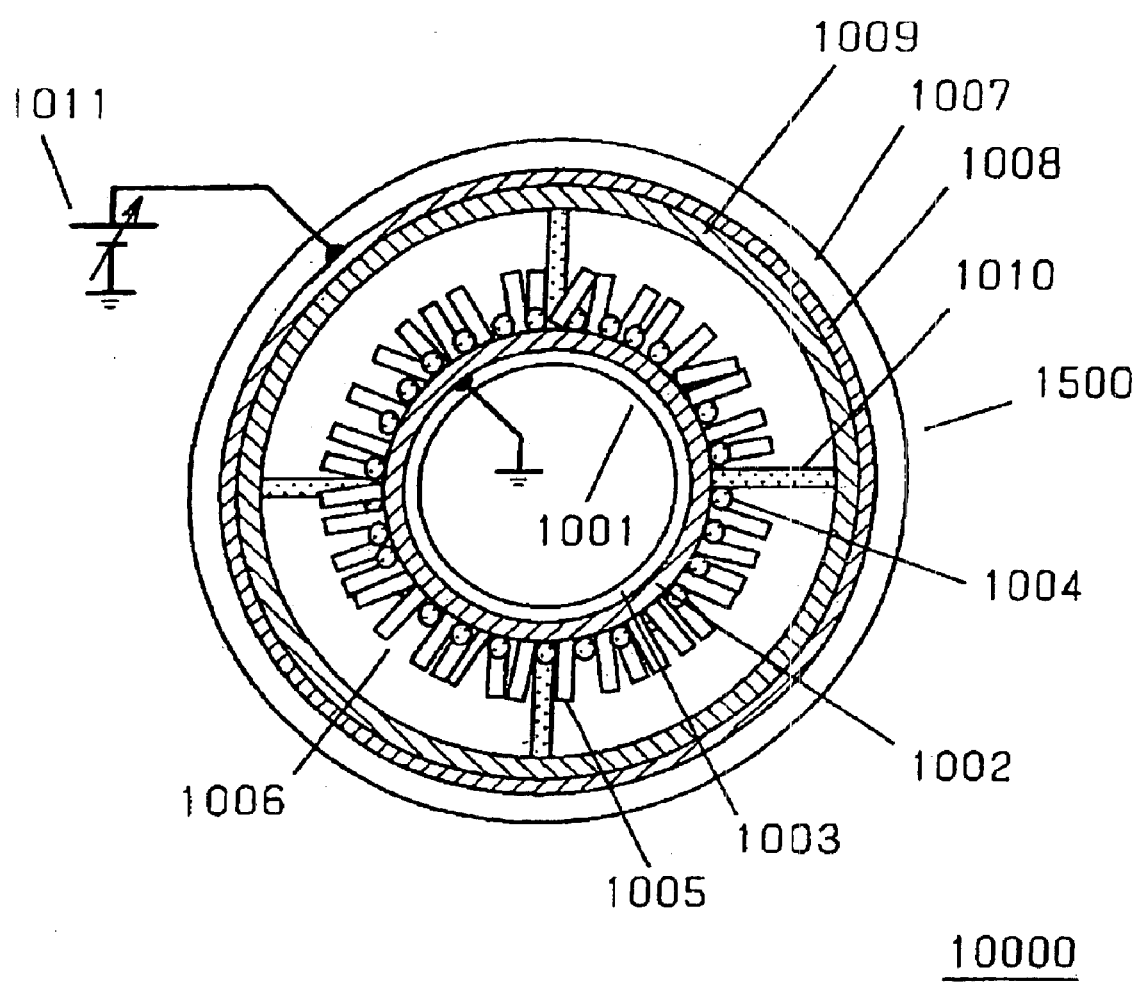
FIG. 10 is a schematic view showing the configuration of an electron-emitting element in another example of the first invention group and a fluorescent lamp utilizing the emitting element.
Figure 11:
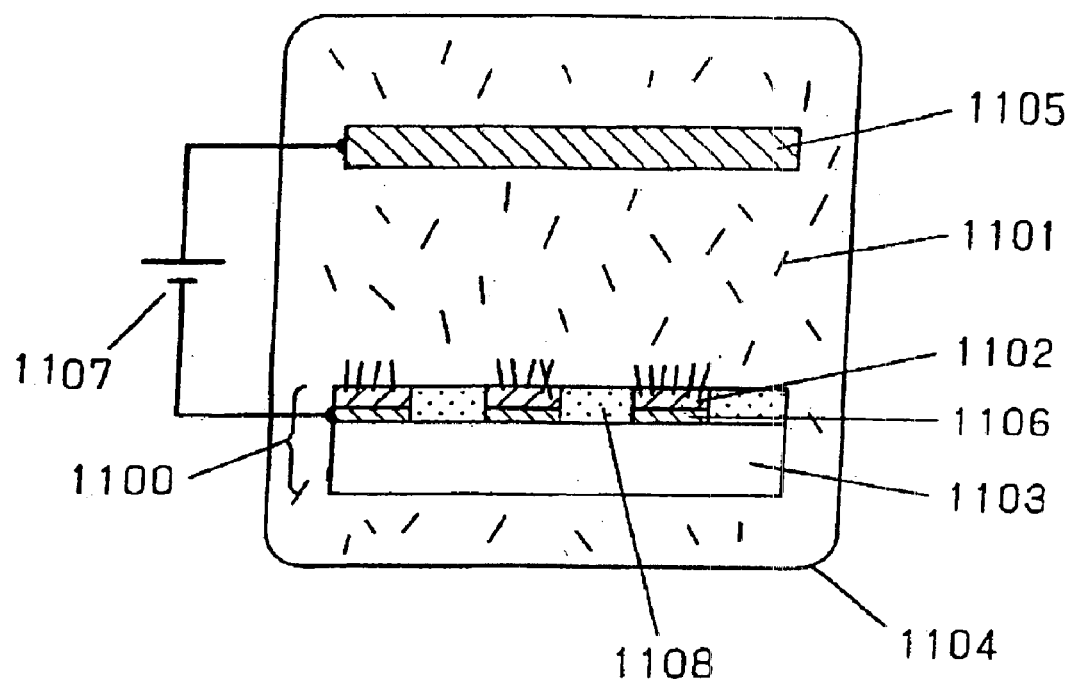
FIG. 11 is a schematic view showing the configuration and fabrication method of a prior art electron-emitting element.

FIG. 10 is a schematic structural view of an electron-emitting element 1001 according to Example 1-24 of the present invention and a fluorescent lamp 10000 utilizing the electron-emitting element 1001. Referring to FIG. 10, the configurations and fabrication methods of the electron-emitting element 1001 and the fluorescent lamp 10000 are described below.

As a first conductive electrode 1002, a metal thin film made of Al, an Al—Li alloy, Mg, an Mg—Ag alloy, Au, Pt, Ag, Fe, Ni, Cu, Cr, W, Mo, Ta, Ti, or the like was formed, by sputtering or vacuum deposition, on a cylindrical glass support member 1003. As a second particle, substantially spherical metal fine particle (particle size: 0.1 to 8 μm) made of a material such as Pt, Au, Ag, Cu, Ni, Rh, Pd, Co, a Cu—Sn alloy, a Cu—Zn alloy, a Cu—Ni—Zn alloy, a Cu—Pb alloy, a Cu—Pb—Sn alloy, a Cu—Co alloy, a Cu—Fe—Mn alloy, an Fe—Cr alloy, an Fe—Si alloy, an Fe—Mo alloy, an Fe—Mn alloy, an Fe—W alloy, an Fe—V alloy, an Fe—Nb alloy, stainless steel, or permalloy was dispersed in a volatile organic solvent such as ethanol, isopropyl alcohol, acetone, or toluene. This dispersion was then dripped onto the entire surface of the first conductive electrode 1002 and was allowed to dry, thus dispersing a second particle 1004 over the first conductive electrode 1002.

Subsequently, a liquid having therein carbon nanotube (diameter: 0.5 to 100 nm, length: 2 to 10 μm) serving as a first particle dispersed in the above-described volatile organic solvent or in water mixed with an appropriate surface-active agent was dripped onto the first conductive electrode 1002 and was allowed to dry, thus dispersing a first fine particle 1005. Thereby, over the first conductive electrode 1002 a cold cathode member 1006 made up of hybrid particle of the first fine particle 1005 made of carbon nanotube and the second particle 1004 made of metal fine particle was formed, and thus an electron-emitting element 1001 was formed.

In opposition to the electron-emitting element 1001 serving as a cathode, an anode supporting substrate 1500 was disposed, which includes a cylindrical glass-supporting substrate 1007 having a transparent electrode, serving as a second conductive electrode 1008, made of ITO, $SnO_2$, ZnO, or the like and a phosphor thin film 1009 stacked on the inner wall surface thereof. The space between the anode and the cathode was made a vacuum, and then both ends of the cylindrical glass-supporting substrates 1003 and 1007 were sealed. Thereby, a fluorescent lamp 10000 was configured. It should be noted that the distance between the cathode 100 and the anode 150 was set to 0.5 to 5 mm, and in order to maintain this distance, glass plates serving as dielectric spacers 1010 were disposed at appropriate locations. In addition, when sealing, the temperature of the fluorescent lamp 10000 reached 400 to 500° C.

It should be noted that for the dielectric spacers 1010, glass bead or glass fiber may be used in addition to glass plates.

A bias voltage was applied between the cathode 1001 and the anode 1500 of such a fluorescent lamp 10000 that was described above, using a direct-current power supply 1011 As a result, it was observed that under bias conditions where the voltage of the direct-current power supply 1011 was about 500 V to 5 kV, electrons were emitted from the surface of the cold cathode member 1006 into a vacuum and these emitted electrons were accelerated by an electric field created by the direct-current power supply 1011 and collided with the phosphor thin film 1009, whereby light emission from the phosphor thin film 1009 occurred. In addition, it was confirmed that the time variation of the brightness of light emission was as small as 5% or less and the operation was stable.

Furthermore, in the foregoing Examples 1-1 to 1-24, as the means of applying a voltage between the anode and the cathode, a direct-current power supply was utilized; however, it is also possible to utilize an alternating-current power supply, an alternating-current power supply having direct current voltage superposed thereon, or a means such that an alternating-current power supply is provided with a half-wave rectification circuit or a full-wave rectification circuit.

Moreover, in the foregoing Examples 1-1 to 1-24, for glass-supporting substrates 101, 106, and 1003, it is possible to use, for example, heat-resistant glass (Pyrex glass, Corning 7740, 7059 and the like), quartz supporting substrates, or supporting substrates made of various types of ceramic materials (alumina and the like) or various types of glass ceramics (green sheets).

For dielectric spacers 908 and 1010 in Examples 1-13 to 1-24, ceramic, glass ceramic and the like can also be used in addition to glass. Further, in field emission displays of Examples 1-1 to 1-12, in order to maintain the distance between the cathode and the anode, dielectric spacers such as those described above may also be used.

As is clear from the above description, electron-emitting elements of the present invention have low operating voltages, large operating currents, and stable discharge performance. In addition, although prior art techniques require a polysilane coating process (a cleaning step and a polysilane coating step) and a UV irradiation process (an alignment step and a UV irradiation step), which in turn increases cost, the present invention does not require such processes.

According to the present invention, a cold cathode member can be disposed over a wide area by a simple coating process or printing process, and therefore an electron-emitting element, a large-sized field emission display device, and a fluorescent lamp can be fabricated at low cost.

Background Art of the Second Invention Group

Cold cathode type electron-emitting elements have a special feature in that they do not need to be heated to high temperatures and are capable of emitting electrons even at low voltages. Therefore, naturally, the cold cathode type electron-emitting element is required to have element characteristics such as stable high current capability with a low voltage and low power consumption operation. A technique that renders such characteristics is specified in, for example, Japanese Patent Publication No. 2793702. This technique is described with reference to FIG. 20.

Graphite is adhered onto a glass supporting substrate 2201, serving as a cathode supporting substrate, by screen printing or the like and is then baked, thereby forming a graphite electrode 2202. Tetrapod-like ZnO whisker powder is dispersed in a solution such as $PdCl_2$, which is an auxiliary fluid for Ni plating, and the whisker powder is coated over the substrate by wet sedimentation. After drying, a metallic material with a low work function such as Ni is coated over the surface of the ZnO whisker, by electroless plating, to a thickness of several Å to several tens of Å. Thereby, the whisker is fixed onto the graphite supporting substrate 2202, thus configuring an emitter electrode 2203.

Subsequently, above the emitter electrode 2203 thus formed, a gate electrode 2204 made of, for example, a metal plate having mesh-like openings is provided at a distance of about several $\mu$m to several hundreds of $\mu$m from the tip of the ZnO whisker, using spacers 2205 disposed between the substrate and the gate electrode, thus configuring a field emission cathode 2206.

This technique utilizes, as the electron-emissive material, whisker having a sharp tip and capable of maintaining its position suitably on the substrate, and therefore electron emission can be easily induced efficiently with a low voltage. Use of whisker having a sharp tip, however, has the following problems.

(1) Only the very sharp tip of the tetrapod-like ZnO whisker is in contact with the graphite electrode 2202, and therefore the contact area with the electrode is very small. For this reason, when injecting electrons into the ZnO whisker, electrical resistance is very large and thus smooth electron injection is not achieved. This problem cannot be sufficiently overcome even if the surface of the ZnO whisker is coated with a low work function material.

(2) The tip of the tetrapod leg of the ZnO whisker is very sharp and has a great electric field concentration effect; at the same time, however, it is easily broken. In order to prevent whisker from breaking, whisker needs to be coated over the supporting substrate without applying unnecessary force; however, the above-described technique that employs wet sedimentation is complicated and thus is problematic for productivity. Needless to say, when the leg is partly broken, the sharpness of the tip is lessened, resulting in reduction in electric field concentration effect.

(3) Furthermore, when configuring a display utilizing an electron-emitting element, a plurality of electron-emitting elements need to be arranged and formed on one same supporting substrate; however, with the above-described technique it is difficult to perform patterning without damaging the whisker.

Disclosure of the Second Invention Group

The principal objects of the present invention are to solve the foregoing problems arising with prior art techniques that utilize whisker and to provide a cold cathode electron-emitting element at low cost which provides a large current at low voltage operation and has stable discharge characteristics. These objects are achieved by the second invention group. The inventions of the second invention group feature the following configurations.

According to a forty-fourth aspect of the second invention group of the present invention, there is provided an electron-emitting element comprising: a cold cathode member including hybrid particle made of a first particle and a second particle, the first particle being multi-legged particle; and an electron-transporting member for supplying electrons to the cold cathode member; the cold cathode member and the electron-transporting member being provided on a supporting substrate, wherein the first particle is adhered to a surface of the first particle like a projection.

According to a forty-fifth aspect of the present invention, in the electron-emitting element according to the forty-fourth aspect, the second particle is fiber-like particle.

According to a forty-sixth aspect of the present invention, in the electron-emitting element according to the forty-fifth aspect, the second particle is carbon fiber.

According to a forty-seventh aspect of the present invention, in the electron-emitting element according to the forty-fifth aspect, the second particle is graphite having six-membered carbocycle with dangling σ bonds.

According to a forty-eighth aspect of the present invention, in the electron-emitting element according to the forty-fifth aspect, the second particle is carbon nanotube.

According to a forty-ninth aspect of the present invention, in the electron-emitting element according to the forty-fifth aspect, the first particle is a metal selected from the group consisting of Zn, Al, Si, Ti, Fe, B, and Mg, or an oxide, nitride, or carbide of these metals.

According to a fiftieth aspect of the present invention, in the electron-emitting element according to the forty-ninth aspect, the first particle is tetrapod-like whisker.

According to a fifty-first aspect of the present invention, there is provided an electron-emitting element comprising: a cold cathode member including hybrid particle made of a first particle and a second particle, the first particle being multi-legged particle; and an electron-transporting member for supplying electrons to the cold cathode member; the cold cathode member and the electron-transporting member being provided on a supporting substrate, wherein the first particle has legs, at least one of the legs projecting into the space and the rest of the legs being electrically connected to the electron-transporting member via their tips; and wherein the second particle is conductive and is in a vicinity of the legs of the first particle, whereby an electrical connection between the first particle and the electron-transporting member is strengthened.

According to a fifty-second aspect of the present invention, in the electron-emitting element according to the fifty-first aspect, the first particle is a metal selected from the group consisting of Zn, Al, Si, Ti, Fe, B, and Mg, or an oxide, nitride, or carbide of these metals.

According to a fifty-third aspect of the present invention, in the electron-emitting element according to the fifty-second aspect, the first particle is tetrapod-like whisker.

According to a fifty-fourth aspect of the present invention, in the electron-emitting element according to the fifty-third aspect, the second particle is fiber-like particle.

According to a fifty-fifth aspect of the present invention, in the electron-emitting element according to the fifty-fourth aspect, the second particle is carbon fiber.

According to a fifty-sixth aspect of the present invention, there is provided an electron-emitting element comprising at least: a supporting substrate; an electron-transporting member provided on the supporting substrate; a bonding layer provided on the electron-transporting member, the bonding layer being made of a photosensitive resin; and a cold cathode member fixed to the bonding layer; wherein the cold cathode member is made of hybrid particle including a first particle and a second particle.

According to a fifty-seventh aspect of the present invention, in the electron-emitting element according to the fifty-sixth aspect, the bonding layer made of a photosensitive resin contains conductive particle.

According to a fifty-eighth aspect of the present invention, in the electron-emitting element according to the fifty-sixth aspect, the first particle and the second particle have different electron emission efficiencies.

According to a fifty-ninth aspect of the present invention, in the electron-emitting element according to the fifty-sixth aspect, the first particle is multi-legged particle and the second particle is fiber-like particle. According to a sixtieth aspect of the present invention, in the electron-emitting element according to the fifty-ninth aspect, the multi-legged particle is a metal selected from the group consisting of Zn, Al, Si, Ti, Fe, B, and Mg, or an oxide, nitride, or carbide of these metals.

According to a sixty-first aspect of the present invention, in the electron-emitting element according to the sixtieth aspect, the multi-legged particle is tetrapod-like whisker According to a sixty-second aspect of the present invention, in the electron-emitting element according to the fifty-ninth aspect, the fiber-like particle is graphite having six-membered carbocycle with dangling σ bonds.

According to a sixty-third aspect of the present invention, in the electron-emitting element according to the fifty-ninth aspect, the second particle is carbon nanotube.

According to a sixty-fourth aspect of the present invention, there is provided an electron-emitting element comprising at least: a supporting substrate; an electron-transporting member provided on the supporting substrate; and a cold cathode member fixed to the electron-transporting member; wherein the cold cathode member is fixed by carbon or a carbonaceous residue to the electron-transporting member or to the supporting substrate, the carbon or the carbonaceous residue resulting from carbonization of a photosensitive resin.

According to a sixty-fifth aspect of the present invention, in the electron-emitting element according to the sixty-fourth aspect, the cold cathode member is made of hybrid particle including a first particle and a second particle.

According to a sixty-sixth aspect of the present invention, in the electron-emitting element according to the sixty-fifth aspect, the first particle is multi-legged particle and the second particle is fiber-like particle.

According to a sixty-seventh aspect of the present invention, in the electron-emitting element according to the sixty-sixth aspect, the multi-legged particle is a metal selected from the group consisting of Zn, Al, Si, Ti, Fe, B, and Mg, or an oxide, nitride, or carbide of these metals.

According to a sixty-eighth aspect of the present invention, in the electron-emitting element according to the sixty-seventh aspect, the multi-legged particle is tetrapod-like whisker.

According to a sixty-ninth aspect of the present invention, in the electron-emitting element according to the sixty-sixth aspect, the fiber-like particle is graphite having six-membered carbocycle with dangling σ bonds.

According to a seventieth aspect of the present invention, in the electron-emitting element according to the sixty-sixth aspect, the second particle is carbon nanotube.

According to a seventy-first aspect of the present invention, there is provided a method of fabricating an electron-emitting element comprising at least: forming an electron-transporting member on a supporting substrate; forming a photosensitive resin layer on the electron-transporting member; patterning the photosensitive resin layer by pattern exposure and development, whereby the photosensitive resin layer is patterned in a predetermined pattern; and bonding an electron-emissive material to a patterned photosensitive resin region.

According to a seventy-second aspect of the present invention, in the method of fabricating an electron-emitting element according to the seventy-first aspect, the electron-emissive material is hybrid particle of a first particle and a second particle, the first particle and the second particle having different electron emission efficiencies.

According to a seventy-third aspect of the present invention, in the method of fabricating an electron-emitting element according to the seventy-first aspect, further comprising, between the step of patterning and the step of bonding, performing heat treatment by heating the photosensitive resin layer to a temperature equal to or above its softening temperature.

According to a seventy-fourth aspect of the present invention, in the method of fabricating an electron-emitting element according to the seventy-first aspect, further comprising, after the step of bonding, removing an unbonded portion of the electron-emissive material.

According to a seventy-fifth aspect of the present invention, in the method of fabricating an electron-emitting element according to the seventy-fourth aspect, the step of removing is performed by spraying a fluid onto a surface of the supporting substrate.

According to a seventy-sixth aspect of the present invention, in the method of fabricating an electron-emitting element according to the seventy-first aspect, further comprising, after the step of bonding, baking the photosensitive resin layer.

According to a seventy-seventh aspect of the present invention, in the method of fabricating an electron-emitting element according to the seventy-fourth aspect, further comprising, after the step of removing, baking the photosensitive resin layer.

According to a seventy-eighth aspect of the present invention, there is provided an electron source comprising at least an electron-emitting element and a control circuit for controlling the electron-emitting element, wherein: the electron-emitting element is the electron-emitting element in accordance with the forty-fourth aspect.

According to a seventy-ninth aspect of the present invention, there is provided an image display device comprising at least an electron source and an image-forming portion for forming images using electrons emitted from the electron source, wherein: the electron source is the electron source in accordance with the seventy-eighth aspect.

According to an eightieth aspect of the present invention, there is provided an electron source comprising at least an electron-emitting element and a control circuit for controlling the electron-emitting element, wherein: the electron-emitting element is the electron-emitting element in accordance with the fifty-first aspect.

According to an eighty-first aspect of the present invention, there is provided an image display device comprising at least an electron source and an image-forming portion for forming images using electrons emitted from the electron source, wherein: the electron source is the electron source in accordance with the eightieth aspect.

According to an eighty-second aspect of the present invention, there is provided an electron source comprising at least an electron-emitting element and a control circuit for controlling the electron-emitting element, wherein: the electron-emitting element is the electron-emitting element in accordance with the fifty-sixth aspect.

According to an eighty-third aspect of the present invention, there is provided an image display device comprising at least an electron source and an image-forming portion for forming images using electrons emitted from the electron source, wherein: the electron source is the electron source in accordance with the eighty-second aspect.

According to an eighty-fourth aspect of the present invention, there is provided an electron source comprising at least an electron-emitting element and a control circuit for controlling the electron-emitting element, wherein: the electron-emitting element is the electron-emitting element in accordance with the sixty-fourth aspect.

According to an eighty-fifth aspect of the present invention, there is provided an image display device comprising at least an electron source and an image-forming portion for forming images using electrons emitted from the electron source, wherein: the electron source is the electron source in accordance with the eighty-fourth aspect.

According to an eighty-sixth aspect of the present invention, there is provided a fluorescent lamp comprising at least an electron source and a phosphor surface caused to emit light by electrons emitted from the electron source, wherein: the electron source is the electron source in accordance with the seventy-eighth aspect.

According to an eighty-seventh aspect of the present invention, there is provided a fluorescent lamp comprising at least an electron source and a phosphor surface caused to emit light by electrons emitted from the electron source, wherein: the electron source is the electron source in accordance with the eightieth aspect.

According to an eighty-eighth aspect of the present invention, there is provided a fluorescent lamp comprising at least an electron source and a phosphor surface caused to emit light by electrons emitted from the electron source, wherein: the electron source is the electron source in accordance with the eighty-second aspect.

According to an eighty-ninth aspect of the present invention, there is provided a fluorescent lamp comprising at least an electron source and a phosphor surface caused to emit light by electrons emitted from the electron source, wherein: the electron source is the electron source in accordance with the eighty-fourth aspect.

According to a ninetieth aspect of the present invention, in the fluorescent lamp according to the eighty-ninth aspect, an extraction electrode for extracting electrons from an electron-emitting element is disposed so as to cover an electron emitting portion.

According to a ninety-first aspect of the present invention, there is provided a method of forming a pattern comprising at least: forming a photosensitive resin layer on a supporting substrate; patterning the photosensitive resin layer by pattern exposure and development, whereby the photosensitive resin layer is patterned in a predetermined pattern; forming a layer to be patterned over the supporting substrate on which the photosensitive resin has been patterned, whereby the layer to be patterned is bonded to the photosensitive resin region; and removing a portion of the layer to be patterned that has not been bonded in the previous step.

According to a ninety-second aspect of the present invention, in the method of forming a pattern according to the ninety-first aspect, further comprising, after the step of removing, burning off the photosensitive resin layer.

Brief Description of the Drawings in the Second Invention Group

FIG. 12 is a schematic cross sectional view of an electron-emitting element of Example 2-1 of the second invention group.

FIG. 13 is an enlarged view of a tetrapod-like whisker particle.

FIGS. 14(a) to 14(c) are schematic views illustrating the process of a fabrication method of an electron-emitting element in Example 2-1 of the second invention group.

FIGS. 15(a) to 15(f) are schematic views illustrating the process of a fabrication method of an electron-emitting element in Example 2-2 of the second invention group.

FIGS. 16(a) to 16(f) are schematic views illustrating the process of a fabrication method of an electron-emitting element in Example 2-3 of the second invention group.

FIGS. 17(a) to 17(d) are schematic views illustrating the process of a fabrication method of an electron-emitting element in Example 2-4 of the second invention group.

FIG. 18 is a schematic structural view of an electron source according to Example 2-9 of the second invention group.

FIG. 19 is a schematic structural view of an image display device according to Example 2-10 of the second invention group.

FIG. 20 is a view for illustrating a prior art electron-emitting element utilizing ZnO whisker.

BEST MODE FOR CARRYING OUT THE SECOND INVENTION GROUP

The second invention group is described in detail below with reference to the examples. It should be noted that members having the same functions in the drawings are designated by the same reference numerals and thus are not further described.

EXAMPLE 2-1

Figure 14:
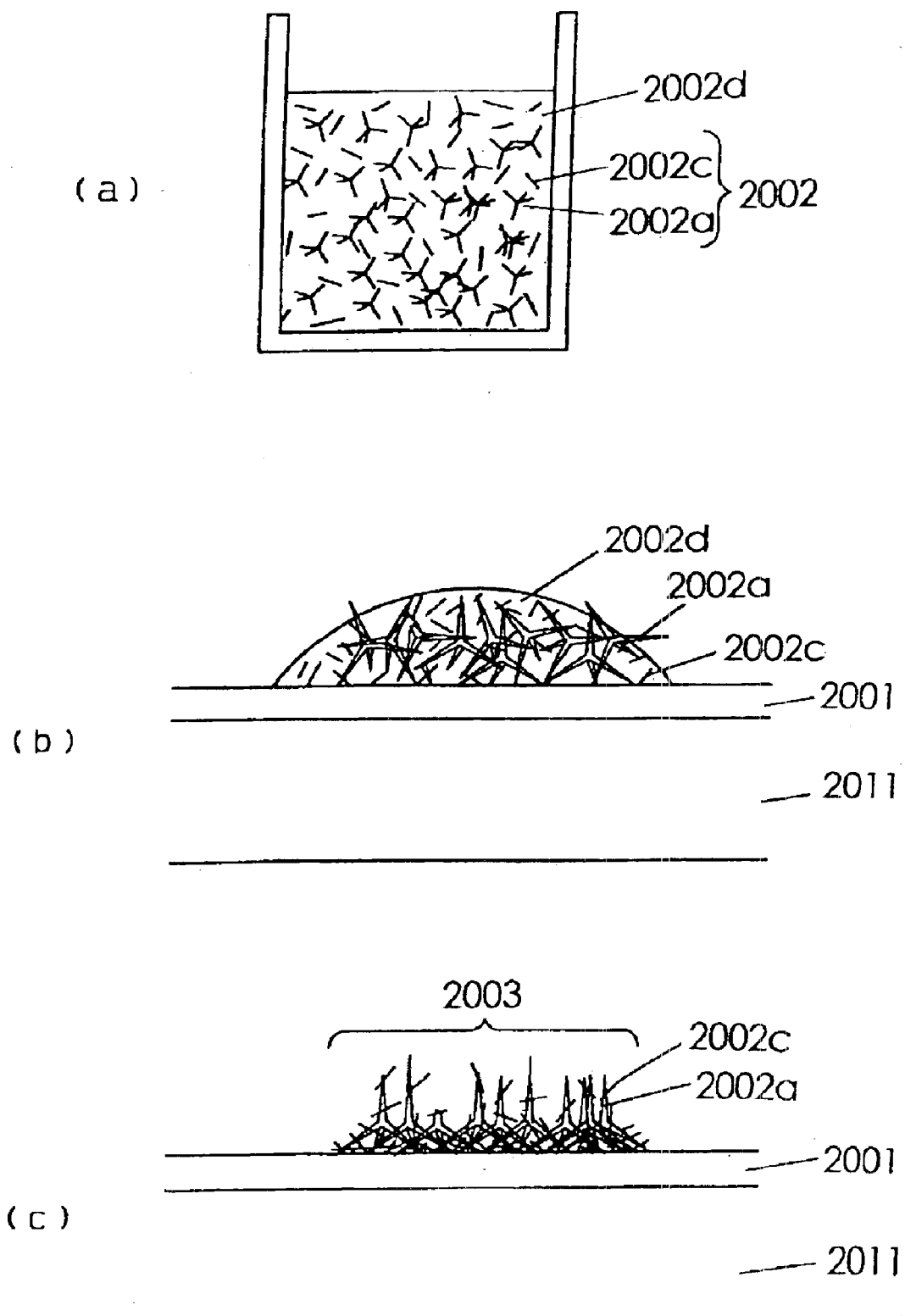

Referring to FIGS. 12 to 14, an electron-emitting element of Example 2-1 of the present invention is described. FIG. 12 is a schematic cross sectional view showing an electron-emitting element according to Example 2-1 of the present invention and FIG. 13 is an enlarged view of a tetrapod-like whisker particle.

An electron-emitting element shown in FIG. 12 includes a supporting substrate 2011 made of a glass plate, an electron-transporting member 2001 (conductive layer) made of an aluminum film formed on the supporting substrate 2011, and electron-emissive material 2002 (hybrid particle) fixed to the electron-transporting member 2001, the electron-emissive material 2002 including tetrapod-like whisker with four legs 2002a (first particle), which is a type of multi-legged substances, and carbon fiber 2002c (second particle), which is a type of conductive particle. In this structure, a region where the electron-emissive material is fixed is an electron emitting portion 2003 (cold cathode member).

A fabrication method of an electron-emitting element of the present example is described. FIGS. 14(a) to 14(c) are schematic views illustrating the steps of a fabrication process. First, tetrapod-like whisker 2002a and conductive particle 2002c made of carbon fiber are dispersed in a solvent 2002d, thus preparing a mixed dispersion (FIG. 14(a)). For the dispersion solvent 2002d, it is preferable to use a solvent that can be used to coat phosphors in a vacuum, for example, a mixture of 99% isoamyl acetate and 1% nitrocellulose. It should be noted that such a solvent is hereinafter referred to as a vehicle.

Next, on a conductive layer (electron-transporting member 2001) made of an aluminum film with a thickness of 0.01 to 100 $\mu$m, preferably of about 0.1 to 1 $\mu$m, formed on a supporting substrate 2011, the mixed dispersion is coated (FIG. 14(b)). By heating the mixed dispersion, the vehicle is evaporated and removed, thus disposing on the electron-transporting member 2001 provided on the supporting substrate 2011, the electron-emissive material made of hybrid particle of the tetrapod-like whisker 2002a and the carbon fiber particle (FIG. 14(c)). Thereby, an electron-emitting element of Example 2-1 is completed.

This electron-emitting element has a special feature in the structure of the electron emitting portion 2003 (cold cathode member). Specifically, any one of the four legs of the tetrapod-like whisker 2002a projects into the space and the rest of the legs are in contact with the electron-transporting member (conductive layer) 2001. In addition, some of the conductive particle 2002c (carbon fiber particle), which is the other component material of the electron-emissive material, is accumulated around the legs of the tetrapod-like whisker 2002a (which is on the side of the electron-transporting member 2001), and the rest is adhered to the surface of the tetrapod-like whisker 2002a as a projection. In an element having such a structure, the tips of the legs of the tetrapod-like whisker 2002a projecting into the space function as electron emission tips, and the tips of the carbon fiber particle adhered to the surface of the tetrapod-like whisker 2002a function as electron emission tips having a high electric field concentration effect.

On the other hand, the carbon fiber particle accumulated around the legs of the tetrapod-like whisker 2002a function as a conductor that facilitates electron flow from the electron-transporting member 2001 to the tetrapod-like whisker 2002a.

As has been described above, with this configuration, an electron-emitting element capable of emitting a large current at a low voltage can be realized with little cost increase.

Here, the tetrapod-like whisker (first particle) in the present example had an average diameter of about 20 microns and the carbon fiber (second particle), serving as the conductive particle, had a diameter of the order of submicrons (0.1 to 0.9 $\mu$m) and a length of the order of microns.

A means for performing the above-described coating is not particularly specified, but for example, the following techniques can be employed. The first technique is coating, in advance, a region having a predetermined pattern with the above-described dispersion; specific examples include printing and casting. Printing is suitable for a case where a substrate surface, that to be coated, is flat and has no such irregularities (including structures) that are obstacles when coating. On the other hand, casing is a technique in which the necessary amount of a dispersion is dripped onto a predetermined region using a dispenser and the like, and thus even when a substrate surface has irregularities, coating is possible.

The second technique is coating a dispersion on the entire surface of a substrate and then forming the coated surface into a predetermined pattern; specifically, for example, after coating the entire surface of a substrate by spin coating or dipping and removing the solvent, a technique of cutting away an unnecessary coated portion, or a technique that utilizes photolithography may be used. These techniques provide advantages such as good efficiency in coating operation and facilitation of fine patterning.

It should be noted that tetrapod-like whisker and fiber-like particle are easily broken, therefore it is preferable to use a coating means that does not put unnecessary stress on whisker and fiber.

Here, tetrapod-like whisker is not particularly specified, but for example, "Pana-Tetra" (trade name; available from Matsushita Amtec Co., Ltd.), which is made of ZnO, can be used. The size of whisker is not particularly specified either, but generally, whisker of about 10 $\mu$m (for example, 1 to 30 $\mu$m) is used.

Furthermore, in the foregoing example, tetrapod-like whisker with four legs was used, but the number of legs is not limited to four; whisker with at least three legs is sufficient. This is because when a whisker has at least three legs, while at least one of the legs projects into the space, the whisker can stand on its own with the rest of the legs. It should be noted that in the present specification, a particle having three or more legs is referred to as a multi-legged particle.

Moreover, for the conductive, particle, it is preferable to use a material with a shape that has both properties of good conductivity and low electric field electron emission. Such a material includes, for example, carbon fiber, carbon nanotube, and whisker. Of these materials, it is particularly preferable to use such conductive particle that is mainly composed of graphite having six-membered carbocycle with dangling σ bonds, because such particle can be expected to provide large current discharge at low electric field and also has excellent stability ill terms of material properties.

EXAMPLE 2-2

In Example 2-2, by employing another fabrication method, hybrid particle was prepared in which more carbon fiber particles were adhered to the surface of tetrapod-like whisker. Except that such hybrid particle was utilized as the electron-emissive material, the present example is the same as the foregoing Example 2-1. Hence, the present example focuses on describing a fabrication method.

FIGS. 15(a) to (f) are schematic views for illustrating a fabrication process in the present example. Referring to these drawings, a fabrication method of an element of Example 2-2 is described.

Figure 15:
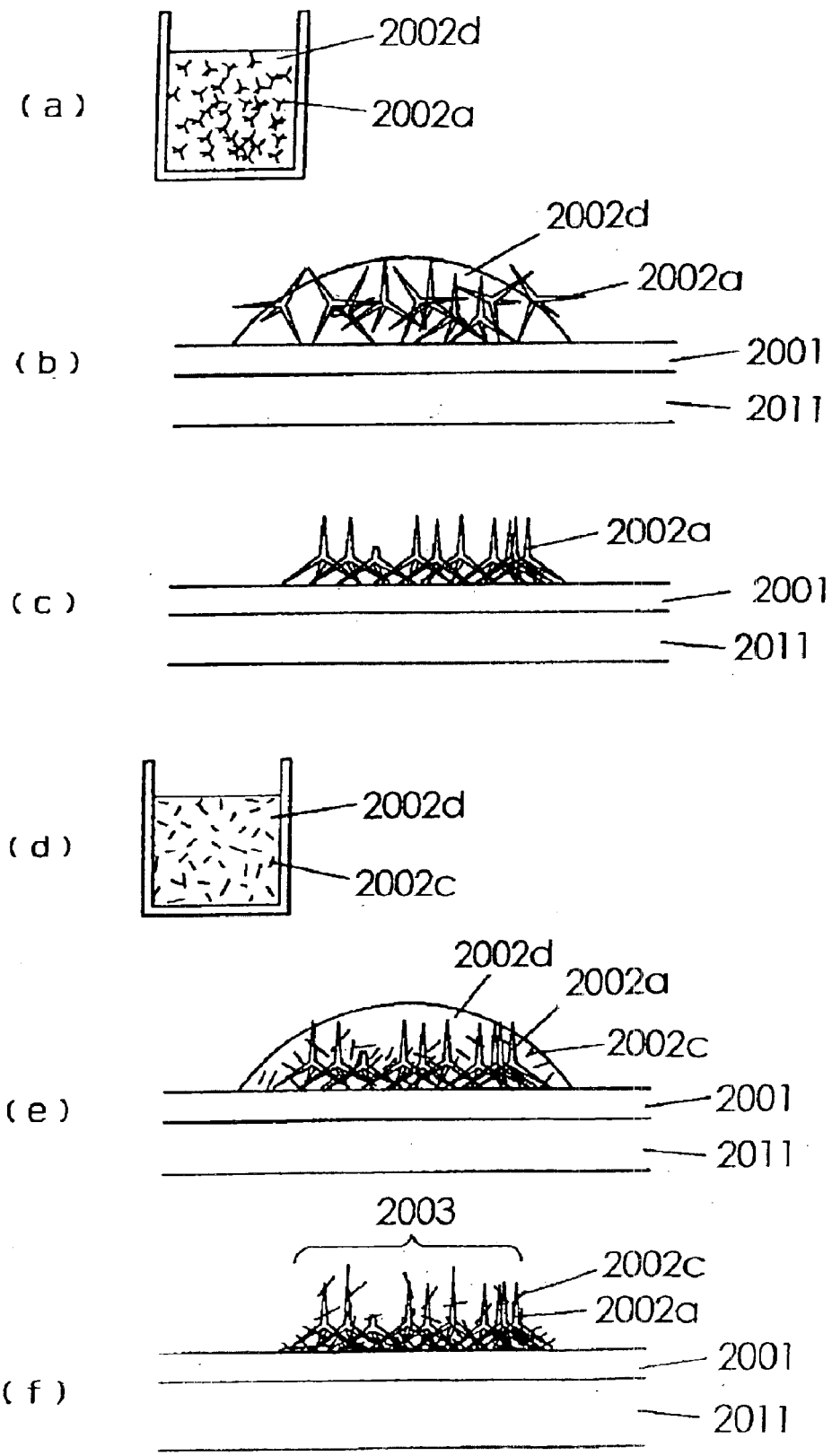

First, a first dispersion is prepared in which tetrapod-like whisker is dispersed in a solvent (vehicle) similar to the one used above, and the first dispersion is coated over a conductive layer (electron-transporting member 2011) provided on a supporting substrate 2011 (FIG. 15(b)). Subsequently, the coated surface is heated and dried such that only the tetrapod-like whisker is disposed on the supporting substrate 2011 (FIG. 15(c)).

Next, a second dispersion is prepared in which carbon fiber, which is conductive fiber-like particle, is dispersed in a solvent similar to the one used above, and the second dispersion (FIG. 15(d)) is coated over the tetrapod-like whisker that was disposed on the supporting substrate 2011 in the foregoing step (FIG. 15(e)). Subsequently, the coated surface is heated and dried, whereby the carbon fiber is adhered to the surface of the tetrapod-like whisker and to the surface of the conductive layer (Fig. (f)).

Thus, an electron-emitting element of Example 2-2 is completed. In this fabrication method, first, tetrapod-like whisker is coated and then carbon fiber is coated, thus allowing more carbon fibers to be adhered to the surface of the tetrapod-like whisker as projections than in the case of Example 2-1 where two different types of particles are coated at the same time using a mixed dispersion. The tip of such carbon fiber functions as electron emission tips. Therefore, according to the present example, a higher electron emission density can be realized at a lower voltage.

Furthermore, with this method, inconvenience resulting from different specific gravities between particles can be avoided.

Specifically, in a case where a mixed dispersion is used in which particles of multiple types are dispersed in a single solution, when the difference of the specific gravity between each particle is great, a non-uniform dispersion results, and thus the composition of the particles on the coated surface becomes non-uniform. However, this phenomenon does not occur when using a dispersion in which particles of a single type are dispersed.

In the present invention, a particle whose principal role is to emit electrons is referred to as an electron emitting particle (first particle) and a particle whose principal role is to lessen resistance when electrons flow to the electron emitting particle, and/or to control the position of the electron emitting particle so as to be advantageous for electron emission is referred to as a position-controlling particle (second particle). According to these definitions, the tetrapod-like whisker in Example 2-2 serves as a position-controlling particle (second particle) which controls the position of carbon fiber so that the carbon fiber emits electrons easily, and the carbon particle in the same example serves as an electron emitting particle (first particle). It should be noted, however, electrons are, of course, also emitted from the tetrapod-like whisker and therefore whether particle is designated as a first particle or a second particle is determined relatively, considering the whole balance.

It should be noted that the coating means described in Example 2-1 can also be employed in the present example.

EXAMPLE 2-3

Example 2-3 is the same as the foregoing Example 2-1, except that as the electron-emissive material, hybrid particle is used in which more carbon fiber particle is accumulated around the legs of tetrapod-like whisker. In addition, a fabrication method employed in the present example is similar to that described in the foregoing Example 2-2, except that the compositions of the first and second dispersions are different from those in Example 2-2. Referring to FIGS. 16(a) to 16(f), a fabrication method is described below which allows more carbon fiber particle to be accumulated around the legs of tetrapod-like whisker.

Figure 16:
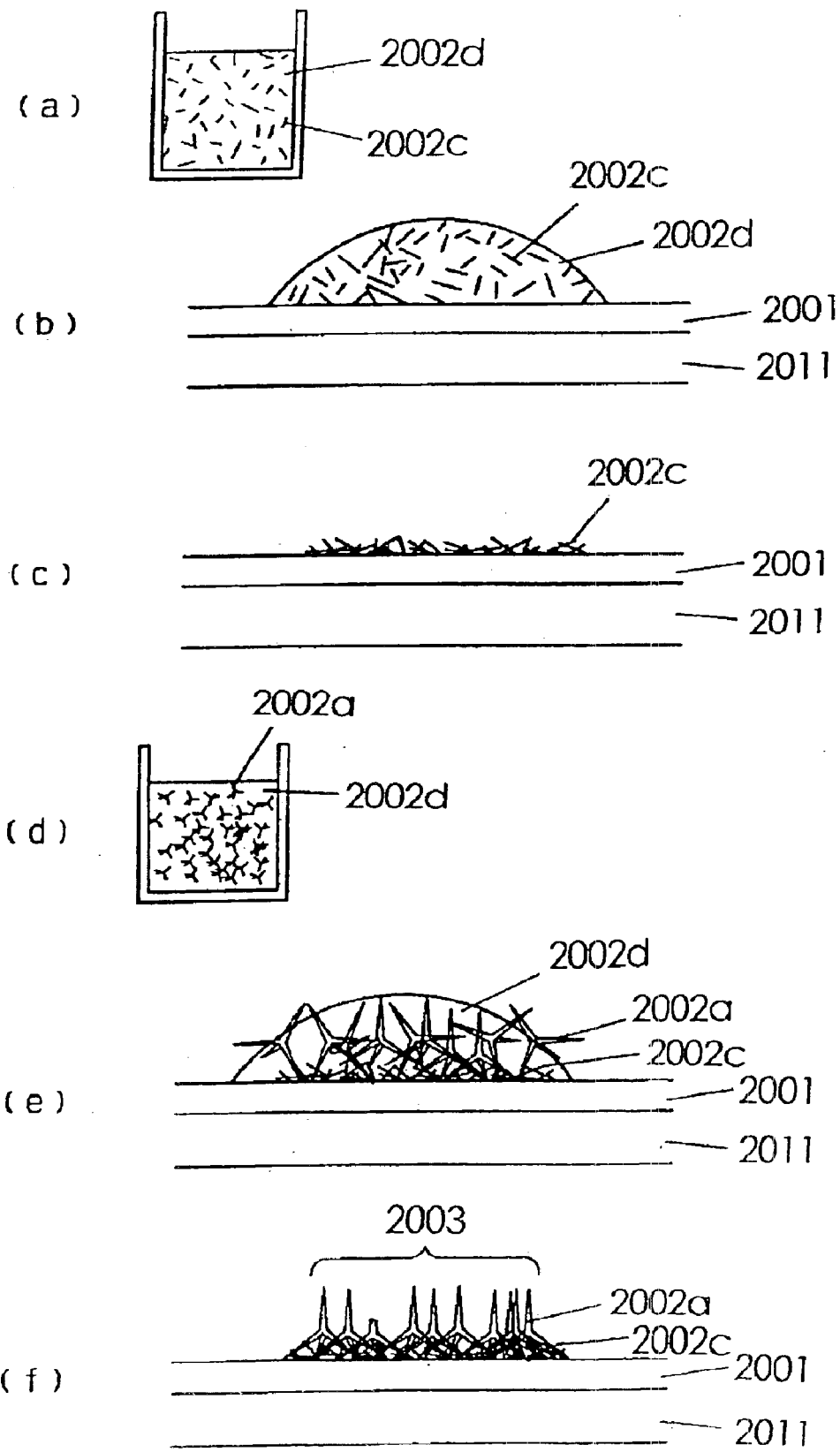

First, a first dispersion (FIG. 16(a)) is prepared in which carbon fiber particle is dispersed in a solvent (vehicle) similar to the one used above, and the first dispersion is coated over a conductive layer (electron-transporting member 2011) provided on a supporting substrate 2011 (FIG. 16(b)). Subsequently, the coated surface is heated and dried such that only the carbon fiber particle is disposed on the supporting substrate 2011 (FIG. 16(c)).

Next, a second dispersion is prepared in which tetrapod-like whisker particle is dispersed in a solvent similar to the one used above, and the second dispersion (FIG. 16(d)) is coated over the carbon fiber particle 2002c that was disposed on the supporting substrate 2011 in the foregoing step (FIG. 16(e)). Subsequently, the coated surface is heated and dried, thereby forming an electron emitting portion (cold cathode member) in which more carbon fiber particle is accumulated around the legs of the tetrapod-like whisker (FIG. 16(f).

Thereby, an electron-emitting element of Example 2-3 is completed. This fabrication method differs from that of the foregoing Example 2-2 in that carbon fiber particle first is coated and then tetrapod-like whisker particle is coated. With this fabrication method, it is possible to fabricate an electron-emitting element that provides a smooth flow of electrons to the electron-emissive material, which can be explained as follows. Since the tips of the legs of tetrapod-like whisker particle are extremely thin, the electrical resistance between the whisker particle and the conductive layer (electron-transporting member 2001) is large, but with this configuration, conductive carbon fiber is accumulated around the legs of tetrapod-like whisker particle and functions to reduce the electrical resistance.

It should be noted that the tetrapod-like whisker particle in the present example corresponds to electron emitting particle (first particle) and the carbon fiber particle to position-controlling particle (second particle) which supports the electron emitting particle. It should also be noted, however, that the role of the second particle in the present example is principally to provide an effect of improving conductivity and thus the second particle has only a small effect on position control

EXAMPLE 2-4

The present example has a special feature in that such a fabrication method was employed that a bonding layer is formed in advance on a conductive layer (electron-transporting member 2001) provided on a supporting substrate and by using this bonding layer, electron-emissive material is fixed to the conductive layer. Except this feature, all other components are the same as those of the foregoing Example 2-1. The present example is described below with reference to FIGS. 17(a) to 17(d).

First, on a supporting substrate made of a glass plate 2011 having formed thereon a conductive layer (electron-emitting member 2001) made of an aluminum film, a bonding layer 2005 made of a photosensitive resin was formed (FIG. 17(a)). Here, for the photosensitive resin, a positive photoresist OFPR-5000 (available from Tokyo Ohka Kogyo Co., Ltd.) was used, and the paste-like resist was coated, by spin coating, on the conductive layer to a thickness of 2 to 6 μm.

After the foregoing coating, pre-baking was performed using a hot plate at 90° C. for 90 seconds. It should be noted that the coated photosensitive resist does not have bonding properties at this point; bonding properties are induced by subsequent treatment.

Furthermore, the bonding layer 2005 made of a photosensitive resist was exposed and developed, and then was patterned into such a pattern and a size that are suitable for forming electron emitting portions (cold cathode members) (FIG. 17(b)). The exposure conditions were set to 100 mW/cm². In addition, for the development, NMD-3 was used and a static-paddle development was performed.

Next, the above-described tetrapod-like whisker particle and carbon fiber particle were dispersed in a solvent (vehicle), thus preparing a mixed dispersion. The mixed dispersion was then coated on the substrate having thereon a pattern formed in the foregoing step (FIG. 17(c)). Here, as a coating technique, for example, spin coating or casting can be employed. It should be noted that the hybrid particle of the tetrapod-like whisker and the carbon fiber particle are to function as the electron-emissive material.

After the mixed dispersion has been coated, the supporting substrate 2011 was subjected to a heat treatment at 160° C. for 3 minutes. This temperature is higher than the post-baking temperature of the photoresist OFPR5000, and therefore by this heat treatment, the bonding layer 2005 (resist pattern) which was patterned in the foregoing step is softened, thus taking on bonding properties. Consequently, the hybrid particle of the tetrapod-like whisker and the carbon fiber particle are selectively bonded to the patterned bonding layer 2005. Then, unbonded hybrid particle was removed from the substrate.

For a technique for removing unbonded hybrid particle from the substrate, it is preferable to employ a non-contact technique which is unlikely to damage the tetrapod-like whisker and the like; such an example includes a technique in which purified water is sprayed like a shower onto the substrate surface.

Thus, an electron-emitting element is completed in which a plurality of electron emitting portions (cold cathode members) are patterned and formed on the supporting substrate 2011 (FIG. 17(d)). In this electron-emitting element, the electron-emissive material is bonded to the substrate by the bonding layer 2005, and thus the element has excellent durability and stability. In addition, according to this method, by patterning the bonding layer the electron emitting portions can be patterned and formed without any external force acting on the electron-emissive material. Hence, the problem of degradation in element performance, resulting from the breaking of the legs of the tetrapod-like whisker particle during patterning, does not occur.

In the above description, as a material for forming the bonding layer 2005, a photosensitive resist whose bonding properties are induced by heat treatment was used, but the material is not limited thereto; other materials may be used so long as the materials have bonding properties and are patternable.

Moreover, after coating the photosensitive resist 2005 on the entire surface of the substrate, patterning was performed and then bonding properties were induced, but the steps are not limited thereto. It is also possible to perform patterning after the electron-emissive materials have been bonded. In addition, it is also possible to employ a technique in which the bonding layer 2005 itself is first patterned by printing, casting, or the like and then is coated.

Furthermore, in the above description, the electron-emissive material was coated on the bonding layer using a mixed dispersion, but it is also possible to employ a technique in which mixed powder is directly sprinkled over the substrate.

In the present example, for increasing the possibility of contact between the electron-emissive material and the electron-transporting member, it is preferable that the second particle be such that it is smaller in size or in volume than the first particle (for example, tetrapod-like whisker particle).

EXAMPLE 2-5

The present example is the same as the foregoing Example 2-4, except that conductive particle is mixed in a bonding layer 2005. Specifically, an electron-emitting element of Example 2-5 was fabricated using the above-described photoresist (OFPR-5000) in which a suitable amount of carbon particle was mixed. Other components are the same as those of Example 2-4.

The present example is preferable because an improvement in conductivity between an electron-transporting member 2001 and electron-emissive material 2002 is achieved.

Here, for the conductive particle, it is possible to use the above-described carbon fiber particle and the like; however, as the object of the conductive particle is to provide conductivity to the bonding layer, it is preferable that conductive particle have excellent conductivity and have such size, shape, and material that do not adversely affect the exposure and development of the photosensitive resist and the resolution of patterning. An example of conductive particle that can be used directly for this application includes a photoresist for color filters and black matrix which is used for liquid crystal display devices (for example, PMER6020EK and the like, available from Tokyo Ohka Kogyo Co., Ltd.). This photoresist is favorable because it contains carbon particle of suitable particle size at a suitable concentration.

EXAMPLE 2-6

An electron-emitting element according to Example 2-6 was fabricated in the same manner as the foregoing Example 2-5, except that only tetrapod-like whisker particle was used as the electron-emissive material.

The present example is intended to verify that the continuity between electron-emissive material and an electron-transporting member can be ensured even when using only tetrapod-like whisker particle. By an actual continuity test, it was confirmed that the continuity is ensured.

EXAMPLE 2-7

The foregoing Example 2-6 employed a process including the following steps: (i) coating a photosensitive resist paste; (ii) pre-baking at 90° C. for 90 minutes; (iii) patterning; iv) coating a hybrid particle dispersion; (v) carrying out heat treatment at 160° C. for 3 minutes; and (vi) removing unbonded particle. On the other hand, Example 2-7 employed a process in which the above-described step (v) was omitted, and a step of performing heat treatment at 160° C. for 3 minutes was inserted between the above-described steps (iii) and (iv), and further a step of sprinkling hybrid particle was employed instead of the above-described step (iv). Otherwise, the same steps as those in Example 2-6 were carried out, and thus an electron-emitting element according to Example 2-7 was fabricated.

According to this fabrication method, by sprinkling electron-emissive material, it is possible to form a patterned electron emitting portion (cold cathode member) on the substrate. It should be noted that in the present example, it is also possible to add a baking step, as will be described below, subsequent to the step (vi) of removing unbonded particle.

EXAMPLE 2-8

Figure 17:
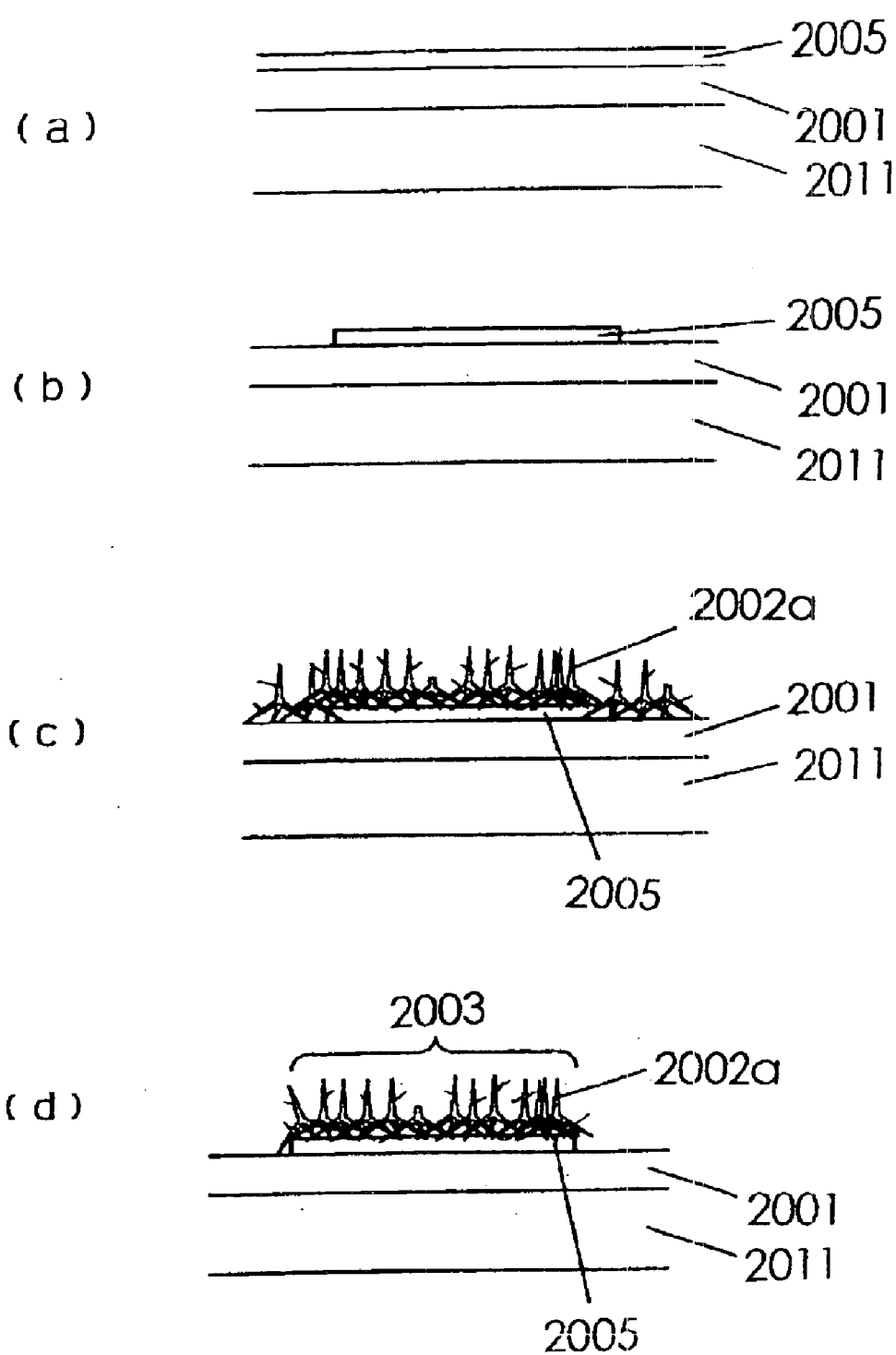

An electron-emitting element according to Example 2-7 was fabricated in the same manner as the foregoing Example 2-5, except that a step of baking a bonding layer 2005 was further added subsequent to the step (d) shown in FIG. 17 in Example 2-4.

Specifically, after unbonded hybrid particle which was not bonded to a bonding layer 2005 had been removed from a substrate, an entire supporting substrate 2011 was subjected to heat treatment at 500° C. for one hour. This temperature is a temperature equal to or higher than the burnout temperature of a resist OFPR5000. Hence, the resist OFPR5000 of which the bonding layer is formed is burned off. It should be noted, however, that in a portion where electron-emissive material was in direct contact with the resist, i.e., between the electron-emissive material and a conductive layer (electron-transporting member 2001), a small amount of carbon or carbonaceous material derived from the resist remains The residue (carbon or carbonaceous material) acts to provide continuity between the electron-emissive material and the conductive layer and also to make the electron-emissive material adhere to the conductive layer.

Thus, according to the present example, by the presence of a small amount of remaining carbon or carbonaceous material, the electron-emissive material such as tetrapod-like whisker particle is securely fixed to the substrate surface and the continuity between the electron-emissive material and the conductive layer (electron-transporting member 2001) is provided.

Moreover, since the photosensitive resist (bonding layer), which is an organic material, is completely removed, even when an electron-emitting device is configured and operated over a long period of time, there is no degradation in device performance resulting from the sublimation of resist components. Thus, with the present example, an electron-emitting element with excellent electron emission performance and high reliability can be provided.

Furthermore, according to the fabrication method described in the present example, carbon or carbonaceous residues improve the continuity between the electron-emissive material and the conductive layer, thus it is not always necessary to use hybrid particle which contains a second particle.

EXAMPLE 2-9

Using electron-emitting elements of Example 2-1, such an electron source that is shown in FIG. 18 was fabricated. FIG. 18 is a schematic structural view of the electron source. As shown in the drawing, the electron source of Example 2-9 is configured utilizing such basic components as a supporting substrate 2011 made of glass, a plurality of electron emitting portions (cold cathode members) 2003 formed on the supporting substrate in a matrix form, and electron extraction electrodes 2004 that control the amount of electrons extracted from electron-emissive material 2002*a*.

With this configuration, electron-transporting members 2001, which are part of the electron emitting portions, are connected to a circuit that transmits electric signals for electron emission to the electron emitting portions, and according to these electric signals, electrons are emitted from the electron-emitting elements. The electron-transporting members 2001 and the circuit connected to the electron-transporting members are formed on the supporting substrate 2011 in a pattern.

Since this electron source employs the electron-emitting elements of Example 2-1 having excellent electron-emission, characteristics, a large current discharge was made possible at a low voltage and also extraction of stable emission current was realized. It should be noted that in the present example the electron source was configured utilizing the electron-emitting elements described in the foregoing Example 2-1, however, the present example is, of course, not limited thereto; it is also possible to utilize any of the elements of Examples 2-2 to 2-8 as the electron-emitting elements for the electron source.

EXAMPLE 2-10

An image display device such as one shown in FIG. 19 (schematic structural view) was fabricated utilizing an electron source of the foregoing Example 2-9. The image display device includes, as shown in FIG. 19: a supporting substrate 2011 made of glass and having formed thereon electron-transporting members 2001 and electron emitting portions (cold cathode members) 2003; an anode supporting substrate 2012 made of glass and having formed on the inner surface thereof an anode electrode with a coating of phosphors, the anode supporting substrate being opposed to the supporting substrate 2011; auxiliary members 2013 which cover the sides; and electron extraction electrodes 2004 disposed midway between the two substrates. A hermetically sealed package is configured with a supporting substrate 2011, the auxiliary members 2013, and the opposing substrate 2012, and the inside of the package is a vacuum It should be noted that the electron extraction electrodes 2004 are to control the number of electrons extracted from electron-emissive material 2002a, and electrons extracted by the electron extraction electrodes 2004 collide with the phosphors provided on the surface of the anode electrode and thus light is emitted, thereby displaying images This image display device utilizes, as an electron source, the electron source of the foregoing Example 2-9 which is capable of discharging a large current at a low voltage and of extracting stable emission current. Therefore, high-quality image display was realized with low voltage operation.

As was described above, according to the inventions of the second invention group, a multi-legged substance whose legs are easily broken such as tetrapod-like whisker can be fixed to and disposed on the supporting substrate in ideal conditions. According to the present invention, excellent characteristics of multi-legged substances, as electron-emissive material, are sufficiently exhibited, and thus improvement in performance of electron-emitting elements can be realized.

INDUSTRIAL APPLICABILITY

As has been described above, according to the present invention, for example, hybrid particle of fine particles having different electron emission efficiencies such as carbon nanotube and carbon fiber can be disposed on and fixed over a large area with few process steps and good productivity. In addition, cold cathode members according to the present invention which are configured utilizing hybrid particle have excellent electron-emission characteristics including large operating current extraction at low voltage operation and stable electron emission performance. Hence, according to aspects of the present invention that employ such cold cathode members, high-performance electron-emitting elements, electron sources, image display devices, fluorescent lamps and the like can be provided at low cost. Thus, the value of the present invention to industry is considerable.

What is claimed is:

1. An electron-emitting element comprising at least a first electrode and a cold cathode member located on a support member wherein:

the cold cathode member comprises first particles having tips and second particles, substantially all the second particles being located directly on the first electrode with substantially no first particles interposed between the second partaicles and the first electrode, and the first particles being located on at least a surface of the second particles, wherein one tip of each first particle is oriented in a direction away from the first electrode; and the first and second particles are conductive.

2. The electron-emitting element according to claim 1, wherein:

the first particles are rod-shaped or plate-shaped.

3. The electron-emitting element according to claim 2, wherein heights of the second particles from a surface of the first electrode are smaller than heights of the first particles from the surface of the first electrode.

4. The electron-emitting element according to claim 1, wherein the first particles are carbon.

5. The electron-emitting element according to claim 4, wherein the first particles comprise particles selected from the group consisting of graphite particles, carbon nanotubes, and carbon fibers.

6. The electron-emitting element according to claim 1, wherein the first particles are nanotubes comprising an atom selected from the group consisting of carbon, silicon, boron, nitrogen, and oxygen fixed to each nanotube.

7. The electron-emitting element according to claim 1, wherein the second particles are substantially spherical.

8. The electron-emitting element according to claim 1, wherein the second particles each comprise an aggregate of re-shaped particles.

9. The electron-emitting element according to claim 1, wherein the second particles are whisker-shaped.

10. The electron-emitting element according to claim 9, wherein the second particles each comprise at least one atom selected from the group consisting of a titanium atom, an aluminum atom, a boron atom, a carbon atom, a silicon atom, a zinc atom, and an oxygen atom.

11. The electron-emitting element according to claim 1, further comprising a second electrode and a third electrode, wherein between the cold cathode member and the second electrode, the third electrode is located for controlling a number of electrons emitted per unit of time from a surface of the cold cathode member.

12. The electron-emitting element according to claim 1 in combination with a field emission display device, wherein a surface of the cold cathode member of the electron-emitting element is an electron emission source of the field emission display device.

13. The electron-emitting element according to claim 1 in combination with a fluorescent lamp, wherein a surface of the cold cathode member of the electron-emitting element is an electron emission source of the fluorescent lamp.

14. The fluorescent lamp according to claim 13, wherein a second electrode covers the first electrode.

15. A method of fabricating an electron-emitting element comprising a first electrode and a cold cathode member comprising conductive first particles having tips and conductive second particles, substantially all the second particles being located directly on the first electrode with substantially no first particles interposed between the second particles and the first electrode, and the first particles being located on at least a surface of the second particles, wherein one tip of each first particle is oriented in a direction away from the first electrode; the method comprising:

forming a first electrode on a support member; and forming a cold cathode member by dispersing second particles over a surface of the first electrode and by dispersing first particles over at least the surface of the second particles.

16. The method of fabricating an electron-emitting element according to claim 15, wherein the first particles and the second particles have different electron emission efficiencies.

17. The method of fabricating an electron-emitting element according to claim 15, wherein the first particles are for emitting electrons and the second particles are for controlling positions of the particles for emitting electrons.

18. The method of fabricating an electron-emitting element according to claim 15, wherein forming a cold cathode member comprises dispersing the first particles after applying pressure to the second particles that have been dispersed over the surface of the electrode.

19. The method of fabricating an electron-emitting element according to claim 15, wherein forming a cold cathode member comprises electrically charging at least the first particles and dispersing the first particles over the first electrode in an atmosphere where an electric field is applied.

20. A method of fabricating an electron-emitting element comprising at least a first electrode and a cold cathode member comprising conductive first particles having tips and conductive second particles, substantially all the second particles being located directly on the first electrode with substantially no first particles interposed between the second particles and the first electrode, the first particles being located on at least a surface of the second particles, wherein one tip of each first particle is oriented in a direction away from the first electrode, the method comprising:

forming a first electrode on a support member; and forming a cold cathode member comprising forming a dispersion in which the first particles having carbon nanotubes and the second particles having metals or metal alloys are mixed and dispersed in a volatile organic solvent, dripping the dispersion onto a surface of the first electrode, locating substantially all the second particles directly on the first electrode with substantially no first particles interposed between the second particles and the first electrode, locating the first particles on at least a surface of the second particles, and orienting one tip of each first particle in a direction away from the first electrode.

21. The method of fabricating an electron-emitting element according to claim 20, wherein the first particles and the second particles have different electron emission efficiencies.

22. The method of fabricating an electron-emitting element according to claim 20, wherein the first particles are for emitting electrons.

23. The method of fabricating an electron-emitting element according to claim 20, wherein forming a cold cathode member comprises electrically charging the first particles and the second particles and simultaneously dispersing the first particles and the second particles over the first electrode in an atmosphere where an electric field is applied.

24. The method of fabricating an electron-emitting element according to claim 20, wherein forming a cold cathode member comprises forming a dispersion in which the first particles and the second particles are dispersed in a volatile solvent, pressurizing the dispersion and discharging the dispersion from a nozzle so that the dispersion adheres to the surface of the first electrode.

25. An electron-emitting element comprising:

a cold cathode member comprising a hybrid particle comprising a first particle and a second particle, the first particle being multi-legged particle; and an electron-transporting member for supplying electrons to the cold cathode member;

the cold cathode member and the electron-transporting member located on a supporting substrate, wherein the second particle is adhered to a surface of the first particle so as to project from said surface.

26. The electron-emitting element according to claim 25, wherein the second particle is a fiber-shaped particle.

27. The electron-emitting element according to claim 26, wherein the second particle is carbon fiber.

28. The electron-emitting element according to claim 26, wherein the second particle is graphite comprising a six-membered carbocycle with dangling σ bonds.

29. The electron-emitting element according to claim 26, wherein the second particle is a carbon nanotube.

30. The electron-emitting element according to claim 45, wherein the first particle is a metal selected from the group consisting of Zn, Al, Si, Ti, Fe, B, and Mg, and an oxide, a nitride, and a carbide of these metals.

31. The electron-emitting element according to claim 30 wherein the first particle is a tetrapod-shaped whisker.

32. An electron source comprising an electron-emitting element and a control circuit for controlling the electron-emitting element, wherein:

the electron-emitting element is the electron-emitting element in accordance with claim 25.

33. An image display device comprising an electron source and an image-forming portion for forming images using electrons emitted from the electron source, wherein:

the electron source is the electron source in accordance with claim 32.

34. A fluorescent lamp comprising an electron source and a phosphor surface caused to emit light by electrons emitted from the electron source, wherein:

the electron source is the electron source in accordance with claim 32.

35. An electron-emitting element comprising:

a cold cathode member comprising a hybrid particle comprising a first particle and a second particle, the first particle being a conductive multi-legged particle and the second particle being a conductive fiber-shaped particle; and an electron-transporting member for supplying electrons to the cold cathode member;

the cold cathode member and the electron-transporting member being located on a supporting substrate, wherein the first particle has multi-legs, each leg having a tip, at least one of the multi-legs projecting into an electron-emitted space and the rest of the legs being electrically connected to the electron-transporting member via their tips; and wherein the second particle is attached to a surface of the first particle so that a tip of the second particle projects into the electron-emitted space, the projecting tip of the second particle functioning as an electron-emitting tip.

36. The electron-emitting element according to claim 35, wherein the first particle is a metal selected from a group consisting of Zn, Al, Si, Ti, Fe, B, and Mg, and oxide, nitride, and a carbide of these metals.

37. The electron-emitting element according to claim 36, wherein the first particle is a tetrapod-shaped whisker.

38. The electron-emitting element according to claim 37,wherein the second particle is carbon fiber.

39. An electron source comprising an electron-emitting element and a control circuit for controlling the electron-emitting element, wherein:

the electron-emitting element is the electron-emitting element in accordance with claim 35.

40. An image display device comprising an electron source and an image-forming portion for forming images using electrons emitted from the electron source, wherein:

the electron source is the electron source in accordance with claim 39.

41. A fluorescent lamp comprising an electron source and a phosphor surface caused to emit light by electrons emitted from the electron source, wherein:
the electron source is the electron source in accordance with claim 39.

42. An electron-emitting element comprising:
a supporting substrate;
an electron-transporting member located on the supporting substrate;
a bonding layer located on the electron-transporting member, the bonding layer being made of a photosensitive resin; and
a cold cathode member fixed to the bonding layer;
wherein the cold cathode member comprises a hybrid particle comprising a first particle and a second particle, the first particle being a conductive multi-legged particle and the second particle being a conductive fiber-shaped particle;
wherein the first particle has multi-legs, each leg having a tip, at least one of the multi-legs projecting into an electron-emitted space and the rest of the legs being electrically connected to the electron-transporting member via their tips; and
wherein the second particle is attached to a surface of the first particle such that a tip of the second particle projects into the electron-emitted space, the projecting tip of the second particle being an electron-emitting tip.

43. The electron-emitting element according to claim 42, wherein the bonding layer comprising a photosensitive resin comprises a conductive particle.

44. The electron-emitting element according to claim 42, wherein the first particle and the second particle have different electron emission efficiencies.

45. The electron-emitting element according to claim 42, wherein the multi-legged particle is a metal selected from the group consisting of Zn, Al, Si, Ti, Fe, B, and Mg, and an oxide, a nitride, and a carbide of these metals.

46. The electron-emitting element according to claim 45, wherein the multi-legged particle is a tetrapod-shaped whisker.

47. The electron-emitting element according to claim 42, wherein the fiber-shaped particle is graphite comprising a six-membered carbocycle with dangling σ bonds.

48. The electron-emitting element according to claim 42, wherein the second particle is a carbon nanotube.

49. An electron source comprising an electron-emitting element and a control circuit for controlling the electron-emitting element, wherein:
the electron-emitting element is the electron-emitting element in accordance with claim 42.

50. An image display device comprising an electron source and an image-forming portion for forming images using electrons emitted from the electron source, wherein:
the electron source is the electron source in accordance with claim 49.

51. A fluorescent lamp comprising an electron source and a phosphor surface caused to emit light by electrons emitted from the electron source, wherein:
the electron source is the electron source in accordance with claim 49.

52. An electron-emitting element, comprising:
a supporting substrate;
an electron-transporting member located on the supporting substrate; and
a cold cathode member fixed to the electron-transporting member;
wherein the cold cathode member is fixed by carbon or a carbonaceous residue of a photosensitive resin to the electron-transporting member or to the supporting substrate;
wherein the cold cathode member comprises a hybrid particle including a first particle and a second particle.

53. The electron-emitting element according to claim 52, wherein the first particle is a multi-legged particle and the second particle is fiber-like particle.

54. The electron-emitting element according to claim 53, wherein the multi-legged particle is a metal selected from the group consisting of Zn, Al, Si, Ti, Fe, B, and Mg, and an oxide, a nitride, and a carbide of these metals.

55. The electron-emitting element according to claim 54, wherein the multi-legged particle is a tetrapod-like whisker.

56. The electron-emitting element according to claim 53, wherein the fiber-like particle is graphite comprising a six-membered carbocycle with dangling σ bonds.

57. The electron-emitting element according to claim 53, wherein the second particle is a carbon nanotube.

58. A method of fabricating an electron-emitting element comprising:
forming an electron-transporting member on a supporting substrate;
forming a photosensitive resin layer on the electron-transporting member;
patterning the photosensitive resin layer by pattern exposure to light and development; and
bonding an electron-emissive material to a patterned photosensitive resin region, the electron-emissive material being a hybrid particle of a first particle and a second particle, the first particle and the second particle having different electron emission efficiencies.

* * * * *

UNITED STATES PATENT AND TRADEMARK OFFICE
CERTIFICATE OF CORRECTION

PATENT NO. : 6,914,372 B1
DATED : July 5, 2005
INVENTOR(S) : Koji Akiyama et al.

It is certified that error appears in the above-identified patent and that said Letters Patent is hereby corrected as shown below:

Column 41,
Line 64, change "partaicles" to -- particles --.

Column 42,
Line 9, insert -- the -- between "than" and "heights".
Line 26, change "re-shaped" to -- sphere-shaped --.

Column 43,
Line 59, insert -- a -- between "being" and "multi-legged".

Column 44,
Line 10, change "claim 45" to -- claim 26 --.
Line 51, change "a group" to -- the group --.
Line 52, insert -- an -- between "and" and "oxide".
Line 53, insert -- a -- before "nitride".

Column 46,
Line 26, insert -- a -- between "is" and "fiber-like".

Signed and Sealed this

Fourteenth Day of February, 2006

JON W. DUDAS
*Director of the United States Patent and Trademark Office*